STRESS-STRAIN CURVE
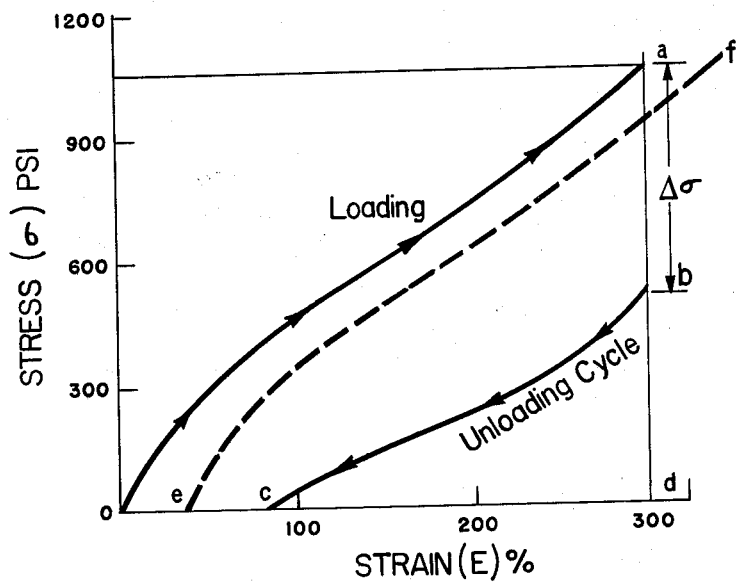
INVENTORS
THOMAS K. BROTHERTON
JOHN W. LYNN
BY
*Vincent P Pirri*
ATTORNEY

United States Patent Office 3,256,220
Patented June 14, 1966

3,256,220
PRODUCTS RESULTING FROM THE REACTION OF CARBONATE DIISOCYANATES WITH ACTIVE HYDROGEN COMPOUNDS
Thomas K. Brotherton, South Charleston, and John W. Lynn, Charleston, W. Va., assignors to Union Carbide Corporation, a corporation of New York
Filed Nov. 25, 1964, Ser. No. 413,927
45 Claims. (Cl. 260—2.5)

This application is a continuation-in-part of United States Patent No. 3,162,664 entitled, "Novel Diisocyanates and Process for Preparation," by T. K. Brotherton and J. W. Lynn, issued July 21, 1964, and application Serial No. 227,071 entitled, "Alcohols," by T. K. Brotherton, J. W. Lynn, and J. Smith, Jr., filed September 28, 1962; both of the above-identified applications being assigned to same assignee as the instant application.

This invention relates to the preparation of novel products which result from the reaction of various polyisocyanate compounds with active hydrogen compounds as described hereinafter. In various aspects, the invention relates to the preparation of novel cast resins, thermoplastic resins, millable gum stocks and the cured products therefrom, prepolymers, elastomers, elastic and relatively non-elastic fibers, urethane foams, adhesives, coatings laminates, reinforced plastic materials, treated textile materials, and the like.

In a broad sense, the invention is directed to the preparation of novel products obtained via the reaction of diisocyanate compounds such as those exemplified by Formula I infra and other polyisocyanates exemplified hereinafter with compounds which contain at least one reactive hydrogen as determined according to the Zerewitinoff test described by Wohler in the Journal of the American Chemical Society, volume 48, page 3181 (1927). The diisocyanate compounds which are contemplated can be represented by the following formula:

(I)
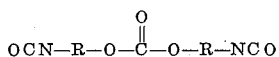
$$\text{OCN-R-O-}\overset{\text{O}}{\underset{\|}{\text{C}}}\text{-O-R-NCO}$$

wherein R represents a divalent substituted or unsubstituted aliphatic, alicyclic, aromatic or heterocyclic group. Preferred compounds are those wherein R represents a divalent radical containing from 2 to 12 carbon atoms. Particularly preferred compounds represented by the aforesaid formula are those wherein R represents a member selected from the group consisting of alkylene, alkenylene, alkynylene, arylene, cycloalkylene, cycloalkenylene, alkylcycloalkylene, alkylcycloalkenylene, and heterocyclylene groups containing from 2 to 12 carbon atoms. Preferred subclasses of diisocyanates include, for example, bis(isocyanatoalkyl) carbonate, bis(isocyanatocycloalkyl) carbonate, bis(isocyanatoalkenyl) carbonate, bis(isocyanatoaryl) carbonate, bis(cycloalkenylene) carbonate, and the like.

The term "substituted" as used throughout the specification and appended claims is meant to define the aforementioned R groups which can be aliphatic with alicyclic or aromatic substituents; alicyclic with aliphatic or aromatic substituents; or aromatic with aliphatic or alicyclic substituents; in addition to other groups hereinafter indicated.

Illustrative carbonate diisocyanate compounds include, for instance, bis(2-isocyanatoethyl) carbonate, bis(2-isocyanato-1-methylethyl) carbonate, bis(4-isocyanatophenyl) carbonate, bis(3-isocyanato-n-propyl) carbonate, bis-(4 - isocyanatobutyl) carbonate, bis(8 - isocyanatooctyl) carbonate, bis(2-methyl-3-isocyanatopropyl) carbonate, bis(2,2-dimethyl-3-isocyanatopropyl) carbonate, 2-isocyanatoethyl 3-isocyanato-n-propyl carbonate, bis(4-isocyanato-2-butenyl) carbonate, bis(5-isocyanato-3-pentenyl) carbonate, bis(3-naphthyl-5-isocyanatopentyl) carbonate, bis(3-styryl-5-isocyanatopentyl) carbonate, bis (3-isocyanatocyclopentyl) carbonate, bis(4-isocyanatocyclohexyl) carbonate, bis(5-isocyanatocycloheptyl) carbonate, bis(4-isocyanto - 5 - cyclohexenyl) carbonate, bis(4-isocyanatophenyl) carbonate, bis(2 - isocyanatophenyl) carbonate, bis(3 - isocyanatophenyl) carbonate, bis(7 - isocyanato-2 - naphthyl) carbonate, bis(4 - isocyanatobenzyl) carbonate, bis(4 - isocyanato - 3 - furyl) carbonate, bis(6 - isocyanato-2-benzofuryl) carbonate, bis(7-isocyanato-2-benzopyranyl) carbonate, and the like.

The active hydrogen-containing compounds which can be employed include, for instance, alcohols, amines, carboxylic acids, phenols, ureas, urethanes, hydrazines, water, ammonia, hydrogen sulfide, imines, thioureas, sulfimides, amides, thiols, amino alcohols, sulfonamides, hydrazones, semi-carbazones, oximes, hydroxycarboxylic acids, aminocarboxylic acids, vinyl polymers which contain a plurality of pendant active hydrogen substituents such as hydroxyl or amino, and the like. In addition, the hydrogen substituent may be activated by proximity to a carbonyl group. The active hydrogen organic compounds represent a preferred class.

Illustrative of the aforesaid active hydrogen compounds are the hydroxyl-containing compounds, especially those which possess at least one alcoholic hydroxyl group and preferably at least two alcoholic hydroxyl groups. Typical compounds include, for instance, the monohydric alcohols such as methanol, ethanol, propanol, isopropanol, 1-butanol, allyl alcohol, 2-butanol, tertbutanol, 3-butenol, 1-pentanol, 3-pentanol, 1-hexanol, hex-5-en-1-ol, 3-heptanol, 2-ethyl-1-hexanol, 4-nonanol, propargyl alcohol, benzyl alcohol, cyclohexanol, cyclopentanol, cycloheptanol, and trimethylcyclohexanol. Further alcohols contemplated include the monoesterified diols such as those prepared by the reaction of equimolar amounts of an organic monocarboxylic acid, its ester, or its halide, with a diol such as alkylene glycols, mono- and polyether diols, mono- and polyester diols, etc., e.g.,

$$\text{R}\overset{\text{O}}{\underset{\|}{\text{C}}}\text{OR'OH}$$

wherein

$$\text{R}\overset{\text{O}}{\underset{\|}{\text{C}}}-$$

is acyl and R' is a divalent organic radical containing at least two carbon atoms in the divalent chain; the monoetherified diols such as those represented by the formula $R_1OR'OH$ wherein $R_1$ represents a monovalent organic radical such as a hydrocarbyl or oxahydrocarbyl radical and R' has the aforesaid value; the mono-ols produced by the partial esterification reaction of a polyol containing at least three hydroxyl groups, e.g., glycerine, with a stoichiometric deficiency of an organic monocarboxylic acid, its ester, or acyl halide; and the like. The aforesaid reactions are well documented in the literature.

Polyhydric alcohols can be exemplified by polyols of the formula HO—R—OH wherein R is a divalent hydrocarbyl radical and preferably a substituted or unsubstituted alkylene radical, the aforesaid formula hereinafter being referred to as "alkylene glycols"; or by the formula HO—R'—OH wherein R' is a substituted or unsubstituted (alkyleneoxy)$_n$ alkylene radical with $n$ being at least one, this latter formula hereinafter being referred to as "polyether glycols." The variables R and R' have at least two carbon atoms in the linear chain, and the substituents or pendant groups on these variables can be, for example, lower alkyl, halo, lower alkoxy, etc., such as methyl, ethyl, n-propyl, isopropyl, chloro, methoxy, ethoxy, and the like. Illustrative alkylene glycols and polyether glycols include ethylene glycol, propylene glycol; butylene glycol; 2,2-dimethyl-1,3-propanediol; 2,2-diethyl-1,3-propanediol; 3-methyl-1,5-pentanediol; 2-butene-1,4-diol; the polyoxyalkylene glycols such as diethylene glycol, dipropylene glycol, dibutylene glycol, polyoxytetramethylene glycol, and the like; the mixed mono- and polyoxyalkylene glycols such as the mono- and polyoxyethyleneoxypropylene glycols, the mono- and polyoxyethyleneoxybutylene glycols, and the like; polydioxolane and polyformals prepared by reacting formaldehyde with other glycols or mixtures of glycols, such as tetramethylene glycol and pentamethylene glycol; and the like. Other polyols include the N-methyl- and N-ethyl-diethanolamines; 4,4'-methylenebiscyclohexanol; 4,4'-isopropylidenebiscyclohexanol; butyne - 1,4 - diol; the ortho-, meta-, and para-xylene glycols; the hydroxymethyl substituted phenethyl alcohols; the ortho-, meta-, and para-hydroxymethylphenylpropanols; the various phenylenediethanols, the various phenylenedipropanols, the various heterocyclic diols such as 1,4-piperazinediethanol; and the like. The polyhydroxyl-containing esterification products which range from liquid to non-crosslinked solids, i.e., solids which are soluble in many of the more common inert normally liquid organic media, and which are prepared by the reaction of monocarboxylic acids and/or polycarboxylic acids, their anhydrides, their esters, or their halides, with a stoichiometric excess of a polyol such as the various diols, triols, etc.; illustrated previously, are highly preferred. The aforesaid polyhydroxyl-containing esterification products will hereinafter be referred to as "polyester polyols." Those polyester polyols which contain two alcoholic hydroxyl groups will hereinafter be termed "polyester diols." Illustrative of the polycarboxylic acids which can be employed to prepare the polyester polyols preferably include the dicarboxylic acids, tricarboxylic acids, etc., such as maleic acid, succinic acid, glutaric acid, adipic acid, pimelic acid, suberic acid, azelaic acid, sebacic acid, chlorendic acid, 1,2,4-butanetricarboxylic acid, phthalic acid, etc. This esterification reaction is well documented in the literature.

Higher functional alcohols suitable for reaction with the novel polyisocyanates, e.g., the novel diisocyanates and the novel polyisocyanato-containing polymers, include the triols such as glycerol, 1,1,1-trimethylolpropane, 1,2,4-butanetriol, 1,2,6-hexanetriol, triethanolamine, triisopropanolamine, and the like; the tetrols such as erythritol, penetaerythritol, N,N,N',N'-tetrakis(2-hydroxyethyl)ethylenediamine, N,N,N',N'-tetrakis(2-hydroxypropyl)ethylenediamine, and the like; the pentols; the hexols such as dipentaerythritol, sorbitol, and the like; the alkyl glycosides such as the methyl glucosides; the carbohydrates such as glucose, sucrose, starch, cellulose, and the like.

Other suitable hydroxyl-containing compounds include the mono- and the polyoxyalkylated derivatives of mono- and polyfunctional compounds having at least one reactive hydrogen atom. These functional compounds may contain primary or secondary hydroxyls, phenolic hydroxyls, primary or secondary amino groups, amide, hydrazino, guanido, ureido, mercapto, sulfino, sulfonamido, or carboxyl groups. They can be obtained by reacting, (1) monohydric compounds such as aliphatic and cycloaliphatic alcohols, e.g., alkanol, alkenol, methanol, ethanol, allyl alcohol, 3-buten-1-ol, 2-ethylhexanol, etc.; diols of the class $HO(R)_nOH$ and $HO(RORO)_nH$ wherein R is alkylene of 2 to 4 carbon atoms and wherein n equals 1 to 10 such as ethylene glycol, propylene glycol, diethylene glycol, dipropylene glycol, and the like; thiodiethanol; the xylenediols, 4,4'-methylenediphenol, 4,4'-isopropylidenediphenol, resorcinol; and the like; the mercapto alcohols such as mercaptoethanol; the dibasic acids such as maleic, succinic, glutaric, adipic, pimelic, sebacic, phthalic, tetrahydrophthalic, and hexahydrophthalic acids; phosphorous acids; phosphoric acids. the aliphatic, aromatic, and cycloaliphatic primary monoamines, like methylamine, ethylamine, propylamine, butylamine, aniline, and cyclohexylamine; the secondary diamines like N,N'-dimethylethylenediamine; and the amino alcohols containing a secondary amino group such as N-methylethanolamine; with (2) vicinal monoepoxide as exemplified by ethylene oxide, 1,2-epoxypropane, 1,2-epoxybutane, 2,3-epoxybutane, isobutylene oxide, butadiene monoxide, allyl glycidyl ether, 1,2-epoxyoctene-7, styrene oxide and mixtures thereof.

Further examples of polyols are the polyoxyalkylated derivatives of polyfunctional compounds having three or more reactive hydrogen atoms such as, for example, the reaction products (adducts) of 1,1,1-trimethylolpropane with a lower vicinal-epoxyalkane, e.g., ethylene oxide, propylene oxide, butylene oxide, and mixtures thereof, in accordance with the reaction:

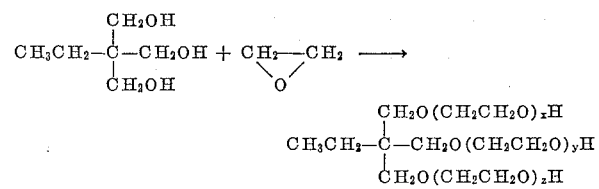

wherein $x+y+z$ equals 3 to 45, and more.

In addition to the polyoxyalkylated derivatives of 1,1,1-trimethylolpropane, the following illustrative compounds are likewise suitable: 1,1,1-trimethylolethane; glycerol; 1,2,4-butanetriol; 1,2,6-hexanetriol; erythritol; pentaerythritol; sorbitol; the alkyl glycosides such as the methyl glucosides; glucose; sucrose; the diamines of the general formula $H_2N(CH_2)_nNH_2$, where $n$ equals 2 to 12; 2-(methylamino)ethylamine; the various phenylene- and toluenediamines; benzidine; 3,3'-dimethyl-4,4'-biphenyldiamine; 4,4'-methylenedianiline; 4,4',4"-methylidynetrianiline, the cycloaliphatic diamines such as 2,4-cyclohexanediamine, and the like; the amino alcohols of the general formula $HO(CH_2)_nNH_2$, where $n$ equals 2 to 10; the polyalkylenepolyamines such as diethylenetriamine, triethylenetetramine, tetraethylenepentamine, and the like; the polycarboxylic acids such as citric acid, aconitic acid, mellitic acid, pyromellitic acid, and the like; and polyfunctional inorganic acids like phosphoric acid. The aforesaid polyfunctional polyoxyalkylated compounds will be referred to hereinafter as "polyoxylalkylated polyols." The polyoxyalkylated polyols which contain two alcoholic hydroxyl groups will be termed "polyoxyalkylated diols" whereas those which contain a sole alcoholic hydroxyl group will be referred to as "polyoxyalkylated mono-ols."

Illustrative amino-containing compounds which are contemplated are those which contain at least one primary amino group ($-NH_2$), or secondary amino group ($-NHR$ wherein R is hydrocarbyl such as alkyl, aryl, cycloalkyl, alkaryl, aralkyl, etc.), or mixtures of such groups. Preferred amino-containing compounds are those which contain at least two of the above groups. Illustrative of the amino-containing compounds include the aliphatic amines such as the alkylamines, e.g., the methyl-, ethyl-, n-propyl-, isopropyl-, n-butyl-, sec-butyl-, isobutyl-, tert-butyl-, n-amyl-, n-hexyl-, and 2-ethylhexylamines, as well as the corresponding dialkylamines; the aromatic amines such as aniline, ortho-toluidine, meta-toluidine, and the like; the cycloaliphatic amines such as cyclohexylamine, dicyclohexylamine, and the like; the heterocyclic amines such as pyrrolidine, piperidine, morpholine, and the like; the various aliphatic diamines of the general formula $H_2N(CH_2)_nNH_2$, monosecondary diamines of the general formula $R''NH(CH_2)_nNH_2$, and disecondary diamines of the general formula $R''NH(CH_2)_nNHR''$, where $n$ equals 2 to 10, and more, and where R'' is hydrocarbyl such as alkyl, aryl, aralkyl, alkaryl, or cycloalkyl; the etheric diamines of the formula $$NH_2-(CH_2)_nOR'O-(CH_2)_nNH_2$$

wherein $n$ is an integer of 2 to 10, and wherein R' is alkylene or oxaalkylene of 2 to 10 carbon atoms; the aromatic diamines such as meta-phenylene-diamine, para-phenylenediamine, toluene-2,4-diamine, toluene-2,6-diamine, 1,5-naphthalenediamine, 1,8-naphthalenediamine, meta-xylylenediamine, para-xylylenediamine, benzidine, 3,3'-dimethyl-4,4'-biphenyldiamine, 3,3' - dimethoxy-4,4'-biphenyldiamine, 3,3'-dichloro - 4,4' - biphenyldiamine, 4,4' - methylenedianiline, 4,4' - methylene - bis(orthochloroaniline), 4,4' - ethylenedianiline, 2,3,5,6 - tetramethyl - para - phenylenediamine, 2,5 - fluorenediamine, and 2,7 - fluorenediamine; the cycloaliphatic diamines such as 1,4-cyclohexanediamine, 4,4'-methylenebiscyclohexylamine, and 4,4' - isopropylidenebiscyclohexylamine; and the heterocyclic amines such as piperazine, 2,5-dimethylpiperazine, 1,4 - bis(3 - aminopropyl)piperazine, and the like.

Illustrative of the higher functional amino-containing compounds which can be employed include, for example, higher polyalkylenepolyamines such as diethylenetriamine, triethylenetetramine, tetraethylenepentamine, dipropylenetriamine, tripropylenetetramine, tetrapropylenepentamine, and the like; 1,2,5 - benzenetriamine; toluene-2,4,6 - triamine; 4,4',4'' - methylidynetrianiline; and the like; the polyamines obtained by interaction of aromatic monoamines with formaldehyde or other aldehydes, for example:

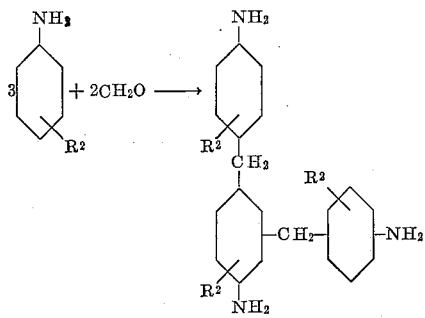

and other reaction products of the above general type, where R² is, for example, hydrogen or alkyl.

Illustrative of the carboxyl-containing compounds include those organic compounds which contain at least one carboxyl group (—COOH) as exemplified by the monocarboxyl-containing compounds such as alkanoic acids; the cycloalkanecarboxylic acids; the monoesterified dicarboxylic acids, e.g.,

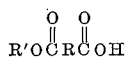

wherein R' is an organic radical such as oxahydrocarbyl, hydrocarbyl, etc., and R is the divalent residue of a dicarboxylic acid after removal of the two dicarboxylic groups; the polycarboxylic acids, e.g., the aliphatic, cycloaliphatic, and aromatic dicarboxylic acids; and the like. Specific examples include propionic acid, butyric acid, valeric acid, dodecanoic acid, acrylic acid, cyclohexanecarboxylic acid, the mono-2-ethylhexyl ester of adipic acid, succinic acid, maleic acid, glutaric acid, adipic acid, pimelic acid, suberic acid, azelaic acid, sebacic acid, chlorendic acid, 4,4'-oxydibutyric acid, 5,5'-oxydivaleric acid, 6,6'-oxydihexanoic acid, 4,4'-thiodibutyric acid, 5,5'-thiodivaleric acid, 6,6'-thiodihexanoic acid, itaconic acid, phthalic acid, isophthalic acid, terephthalic acid, the tetrachlorophthalic acids, 1,5 naphthoic acid, 2,7-naphthoic acid, 2,6-naphthoic acid, 3,3'-methylenedibenzoic acid, 4,4'-(ethylenedioxy)dibenzoic acid, 4,4'-biphenyldicarboxylic acid, 4,4'-sulfonyldibenzoic acid, 4,4'-oxydibenzoic acid, the various tetrahydrophthalic acids, the various hexahydrophthalic acids, tricarballylic acid, aconitic acid, citric acid, hemimellitic acid, trimellitic acid, trimesic acid, pyromellitic acid, 1,2,3,4-butanetetracarboxylic acid, and the like. The polycarboxyl-containing esterification products which range from liquid to noncrosslinked solids and which are prepared by the reaction of polycarboxylic acids, their anhydride, their esters, or their halides, with a stoichiometric deficiency of a polyol such as diols, triols, etc., can also be employed. These polycarboxyl-containing esterification products will hereinafter be referred to as "polycarboxy polyesters."

Compounds which contain at least two different groups of the class of amino (primary or secondary), carboxyl, and hydroxyl, and preferably those which contain at least one amino group and at least one hydroxyl group, can be exemplified by the hydroxycarboxylic acids, the aminocarboxylic acids, the amino alcohols, and the like. Illustrative examples include 2-hydroxypropionic acid, 6-hydroxycaproic acid, 11-hydroxyundecanoic acid, salicylic acid, para-hydroxybenzoic acid, beta-alanine, 6-aminocaproic acid, 7-aminoheptanoic acid, 11-aminoundecanoic acid, para-aminobenzoic acid, and the like; the amino alcohols of the general formula $HO(CH_2)_nNH_2$, where $n$ equals 2 to 10; other hydroxyalkylamines such as N-methylethanolamine, isopropanolamine, N-methylisopropanolamine and the like; the aromatic amino alcohols like para-amino-phenethyl alcohol, para-amino-alpha-methylbenzyl alcohol, and the like; the various cycloaliphatic amino alcohols such as 4-aminocyclohexanol, and the like; the higher functional amino alcohols having a total of at least three hydroxy and primary or secondary amino groups such as the dihydroxyalkylamines, e.g., diethanolamine, diisopropanolamine, and the like; 2-(2-aminoethylamino)ethanol; 2 - amino-2-(hydroxymethyl)-1,3-propanediol; and the like.

The initiated lactone polyesters which contain free hydroxyl group(s) and/or carboxyl group(s) represent extremely preferred active hydrogen containing compounds. These initiated lactone polyesters are formed by reacting, at an elevated temperature, for example, at a temperature of from about 50° C. to about 250° C., an admixture containing a lactone and an organic initiator; said lactone being in molar excess with relation to said initiator; said lactone having from six to eight carbon atoms in the lactone ring and at least one hydrogen substituent on the carbon atom which is attached to the oxy group in said ring; said organic initiator having at least one reactive hydrogen substituent preferably of the group of hydroxyl, primary amino, secondary amino, carboxyl, and mixtures thereof, each of said reactive hydrogen substituents being capable of opening the lactone ring whereby said lactone is added to said initiator as a substantially linear group thereto; said initiated lactone polyesters possessing, on the average, at least two of said linear groups, each of said linear groups having a terminal oxy group at one end, a carbonyl group at the other end, and an intermediate chain of from five to seven carbon atoms which has at least one hydrogen substituent on the carbon atom in said intermediate chain that is attached to said terminal oxy group. The aforesaid polyesters will hereinafter be referred to, in the generic sense, as "initiated lactone polyesters" which term will also include the various "copolymers" such as lactone copolyesters, lactone polyester/polycarbonates, lactone polyester/polyethers, lactone polyester/polyether/polycarbonates, lactone polyester/polyester, etc. These initiated lactone polyesters will contain at least one hydroxyl group and/or at least one carboxyl group depending, of course, on the initiator and reactants employed. Those initiated lactone polyesters which contain at least three alcoholic hydroxyl groups will be referred to as "initiated lactone polyester polyols"; those with two alcoholic hydroxyl groups will be termed "initiated lactone polyester diols." On the other hand, the initiated lactone polyesters which contain at least two carboxyl groups will be referred to as "initiated polycarboxy lactone polyesters."

The preparation of the aforesaid hydroxyl-containing and/or carboxyl-containing initiated lactone polyesters can be effected in the absence or presence of an ester interchange catalyst to give initiated lactone polyesters of widely varying and readily controllable molecular weights without forming water of condensation. These lactone polyesters so obtained are characterized by the presence of recurring linear lactone units, that is, carbonylalkyleneoxy

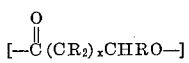

wherein $x$ is from 4 to 6, and wherein the R variables have the values set out in the next paragraph.

The lactone used in the preparation of the initiated lactone polyester may be any lactone, or combination of lactones, having at least six carbon atoms, for example, from six to eight carbon atoms, in the ring and at least one hydrogen substituent on the carbon atom which is attached to the oxy group in said ring. In one aspect, the lactone used as starting material can be represented by the general formula:

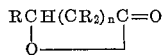

in which $n$ is at least four, for example, from four to six, at least $n+2$ R's are hydrogen, and the remaining R's are substituents selected from the group consisting of hydrogen, alkyl, cycloalkyl, alkoxy and single ring aromatic hydrocarbon radicals. Lactones having greater number of substituents other than hydrogen on the ring, and lactones having four carbon atoms in the ring, are considered unsuitable because of the tendency that polymers thereof have to revert to the monomer, particularly at elevated temperature.

The lactones which are preferred in the preparation of the hydroxyl-containing and/or carboxyl-containing initiated lactone polyesters are the epsilon-caprolactones having the general formula:

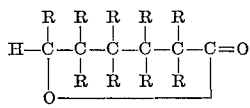

wherein at least six of the R variables are hydrogen and the remainder are hydrogen, alkyl, cycloalkyl, alkoxy, or single ring aromatic hydrocarbon radicals, none of the substituents contain more than about twelve carbon atoms, and the total number of carbon atoms in the substituents on the lactone ring does not exceed about twelve.

Among the substituted epsilon-caprolactones considered most suitable are the various monoalkyl epsilon-caprolactones such as the monomethyl-, monoethyl-, monopropyl-, monoisopropyl-, etc. to monododecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms in the lactone ring are substituted, so long as the epsilon carbon atom is not disubstituted; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones.

Lactones having more than six carbon atoms in the ring, e.g., beta-enantholactone and eta-caprylolactone can be employed as starting material. Mixtures comprising the $C_6$ to $C_8$ lactones illustrated previously, with/without, for instance, the alpha, alpha-disubstituted-beta-propiolactones, e.g., alpha, alpha-dimethyl-beta-propiolactone, alpha, alpha - dichloromethyl-beta-propiolactone, etc.; with/without, for instance, oxirane compounds, e.g., ethylene oxide, propylene oxide, etc.; with/without, for instance, a cyclic carbonate, e.g., 4,4-dimethyl-2,6-dioxacyclohexanone, etc.; are also contemplated.

Among the organic initiators that can be employed to prepare the initiated lactone polyesters include the carboxyl-containing, hydroxyl-containing, and/or amino-containing compounds illustrated previously, e.g., those compounds which have at least one reactive hydrogen substituent as determined according to the Zerewitinoff method.

The initiator is believed to open the lactone ring to produce an ester or amide having one or more terminal groups that are capable of opening further lactone rings and thereby adding more and more lactone units to the growing molecule. Thus, for example, the polymerization of epsilon-caprolactone initiated with an amino alcohol is believed to take place primarily as follows:

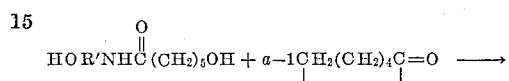

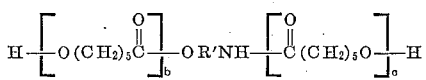

wherein R' (of the initiator and the resulting initiated lactone polyester product) is an organic radical such as an aliphatic, cycloaliphatic, aromatic, or heterocyclic radical, and wherein $a=b+c$.

The reaction of a carboxyl-containing initiator with epsilon-caprolactone is believed to proceed as follows:

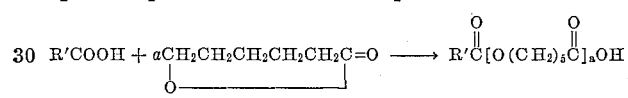

It will be appreciated from the preceding illustrative equations that where a plurality of lactone units are linked together, such linkage is effected by monovalently bonding the oxy (—O—) moiety of one unit to the carbonyl

moiety of an adjacent unit. The terminal lactone unit will have a terminal hydroxyl or carboxyl end group depending, of course, on the initiator employed.

The preparation of the initiated lactone polyester can be carried out in the absence of a catalyst though it is preferred to effect the reaction in the presence of an ester exchange catalyst. The organic titanium compounds that are especially suitable as catalysts include the tetraalkyl titanates such as tetraisopropyl titanate and tetrabutyl titanate. Additional preferred catalysts include, by way of further examples, the stannous diacylates and stannic tetraacylates such as stannous dioctanoate and stannic tetraoctanoate. The tin compounds, the organic salts of lead and the organic salts of manganese which are described in U.S. 2,890,208 as well as the metal chelates and metal acylates disclosed in U.S. 2,878,236 also represent further desirable catalysts which can be employed. The disclosures of the aforesaid patents are incorporated by reference into this specification.

The catalysts are employed in catalytically significant concentration. In general, a catalyst concentration in the range of from about 0.0001 and lower, to about 3, and higher, weight percent, based on the weight of total monomeric feed, is suitable. The lactone polymerization reaction is conducted at an elevated temperautre. In general, a temperature in the range of from about 50° C., and lower, to about 250° C. is suitable; a range from about 100° C. to about 200° C. is preferred. The reaction time can vary from several minutes to several days depending upon the variables illustrated immediately above. By employing a catalyst, especially the more preferred catalysts, a feasible reaction period would be about a few minutes to about 10 hours, and longer.

The polymerization reaction preferably is initiated in the liquid phase. It is desirable to effect the polymerization reaction under an inert atmosphere, e.g., nitrogen.

The preparation of the lactone polyesters via the preceding illustrative methods has the advantage of permitting accurate control over the average molecular weight of the lactone polyester products and further of promoting the formation of a substantially homogeneous lactone polyester in which the molecular weights of the individual molecules are reasonably close to the average molecular weight, that is, a narrow molecular weight distribution is obtained. This control is accomplished by preselecting the molar proportions of lactone and initiator in a manner that will readily be appreciated by those skilled in the art. Thus, for example, if it is desired to form a lactone polyester in which the average molecular weight is approximately fifteen times the molecular weight of the initial lactone, the molar proportions of lactone and initiator utilized in the polymerization reaction are fixed at approximately 15:1 inasmuch as it is to be expected that on the average there will be added to each molecule of initiator approximately fifteen lactone molecules.

The initiated lactone polyesters which are contemplated have average molecular weights as low as 300 to as high as about 7000, and even higher still to about 9000. With vinyl polymers containing a plurality of active hydrogen substituents, e.g., hydroxyl, amino, etc., as initiators, the average molecular weight of the initiated lactone polyesters can easily go as high as 14,000, and higher. Generally, however, the average molecular weight of the initiated lactone polyester is from about 300 to about 9000, preferably from 600 to about 5000.

As intimated previously, also within the term and the scope of the initiated lactone polyesters are those in which the linear lactone units need not necessarily be connected directly to one another. This is readily accomplished, for example, by reacting lactone(s) with combinations of initiators such as dibasic acid(s) plus glycol(s), diamine(s) or amino alcohol(s) such as those exemplified previously. This reaction can be effected at an elevated temperature, e.g., about 100° C. to about 200° C., with all the reactants present, or the reaction of the dibasic acid with the glycol, diamine, or amino alcohol can be accomplished first, and then the resulting amino-, hydroxyl-, or carboxyl-containing products (depending on the reactants and the concentration of same) can be reacted with the lactone to yield hydroxyl-terminated and/or carboxyl-terminated initiated lactone polyesters. Moreover, as also indicated previously, the term and the scope of the hydroxyl- and/or carboxyl-containing initiated lactone polyesters includes the "oxyalkylene-carbooxy-alkylenes" such as described in U.S. Patent No. 2,962,524 which are incorporated by reference into this disclosure. In addition the term and scope of the hydroxyl-containing initiated lactone polyesters also includes the reaction of an admixture comprising a C$_6$–C$_8$ lactone(s), a cyclic carbonate(s), and an initiator having at least one group, preferably at least two groups, of the class of hydroxyl, primary amino, or secondary amino, or mixtures thereof, under the operative conditions discussed above. Exemplary cyclic carbonates include 4,4-dimethyl-2,6-dioxacyclohexanone, 4,4-dichloromethyl-2,6-dioxacyclohexanone, 4,4 - dicyanomethyl - 2,6 - dioxacyclohexanone, 4,4 - diethyl - 2,6 - dioxacyclohexanone, 4,4 - dimethoxymethyl-2,6-dioxacyclohexanone; and the like. Consequently, where a mixture of linear lactone units (i.e.,

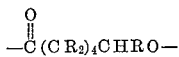

units which are properly termed carbonylalkyleneoxy) and linear carbonate units (i.e.,

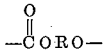

units which can be termed carbonyloxyalkyleneoxy) are contained in the polymer chain or backbone, the carbonyl moiety or one linear unit will be monovalently bonded to the oxy moiety of a second linear unit. The oxy moiety of a terminal linear unit will be bonded to a hydrogen substituent to thus form a hydroxyl end group. Moreover, the point of attachment of the initiator and a linear unit (lactone or carbonate) will be between the carbonyl moiety of said unit and the functional group (hydroxyl or amino) of said initiator sans the active hydrogen substituent of said group.

The preferred initiated lactone polyesters include those which contain at least about 50 mol percent of carbonylpentamethyleneoxy units therein

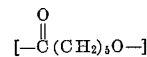

and which possess an average molecular weight of from about 500 to about 5000, particularly from about 600 to about 4000. The remaining portion of the molecule can be comprised of in addition to the initiator, essentially linear units derived from a cyclic carbonate especially those illustrated previously; an oxirene compound especially ethylene oxide, propylene oxide, and/or butylene oxide; a mono- and/or polyalkyl-substituted epsilon-caprolactone especially the mono- and/or polymethyl and/or ethyl-substituted epsilon-caprolactones; and/or an alpha, alpha-disubstituted-beta-propiolactone especially those exemplified previously. The so-called initiated lactone homopolyesters derived from reacting epsilon-caprolactone with an initiator are likewise included within the preferred lactone polyesters. The initiated lactone polyester polyols, and in particular, the substantially linear initiated lactone polyester diols, are exceptionally preferred.

If desired, various compounds can be employed as catalysts in the isocyanato/active hydrogen reactions. Compounds which are oftentimes useful in catalyzing said isocyanato-active hydrogen reactions include the tertiary amines, phosphines, and various organic metallic compounds in which the metal can be bonded to carbon and/or other atoms such as oxygen, sulfur, nitrogen, halo, hydrogen, and phosphorus. The metal moiety of the organic metallic compounds can be, among others, tin, titanium, lead, potassium, sodium, arsenic, antimony, bismuth, manganese, iron, cobalt, nickel, and zinc. Of those which deserve special mention are the organic metallic compounds which contain at least one oxygen to metal bond and/or at least one carbon to metal bond, especially wherein the metal moiety is tin, lead, bismuth, arsenic, or antimony. The tertiary amines, the organic tin compounds (which includes the organotin compounds), and the organic lead compounds are eminently preferred. Preferred subclasses of organic metallic compounds include the acylates, particularly the alkanoates, and alkoxides of Sn(II), Sn(IV), Pb(II), Ti(IV), Zn(IV), Co(II), Mn(II), Fe(III), Ni(II), K, and Na. An additional subclass which is extremely useful is the dialkyltin dialkanoates.

Inorganic metallic compounds such as the hydroxides, oxides, halides, and carbonates of metals such as the alkali metals, the alkaline earth metals, iron, zinc, and tin are also suitable.

Specific catalysts include, by way of illustrations, 1,4-diazabicyclo[2.2.2]octane, N,N,N',N' - tetramethyl - 1,3-butane-diamine, bis[2-(N,N-dimethylamino)ethyl] ether, bis[2 - (N,N - dimethylamino)-1-methylethyl] ether, N-methylmorpholine, sodium acetate, potassium laurate, stannous octanoate, stannous oleoate, lead octanoate, tetrabutyl titanate, ferric acetylacetonate, cobalt naphthenate, tetramethyltin, tributyltin chloride, tributyltin hydride, trimethyltin hydroxide, dibutyltin oxide, dibutyltin dioctanoate, dibutyltin dilaurate, butyltin trichloride, triethylstibine oxide, potassium hydroxide, sodium carbonate, magnesium oxide, stannous chloride, stannic chloride, bismuth nitrate. Other catalysts include those set forth in "Part IV. Kinetics and Catalysis of Reactions" of Saunders et al. "Polyurethanes: Chemistry and Technology— Part I. Chemistry," Interscience Publishers, which is incorporated by reference into this disclosure. In many instances, it is particularly preferred to employ combinations of catalysts such as, for example, a tertiary amine plus an organic tin compound.

The isocyanato-reactive hydrogen reactions can be conducted over a wide temperature range. In general, a temperature range of from about 0° to about 250° C. can be employed. To a significant degree, the choice of the reactants and catalyst, if any, influences the reaction temperature. Of course, sterically hindered novel diisocyanates or active hydrogen compounds will retard or inhibit the reaction. Thus, for example, the reaction involving isocyanato with primary amino or secondary amino can be effected from about 0° C. to about 250° C. whereas the isocyanato-phenolic hydroxyl reaction is more suitable conducted from about 30° C. to about 150° C. Reactions involving primary alcoholic hydroxyl, secondary alcoholic hydroxyl, or carboxyl with isocyanato are effectively conducted from about 20° C. to about 250° C. The upper limit of the reaction temperature is selected on the basis of the thermal stability of the reaction products and of the reactants whereas the lower limit is influenced, to a significant degree, by the rate of reaction.

The time of reaction may vary from a few minutes to several days, and longer, depending upon the reaction temperature, the identity of the particular active hydrogen compound and diisocyanate as well as upon the absence or presence of an accelerator or retarder and the identity thereof, and other factors. In general the reaction is conducted for a period of time which is at least sufficient to provide the addition or attachment of the "active hydrogen" from the active hydrogen compound to the isocyanato nitrogen of the novel diisocyanate. The remainder of the active hydrogen compound becomes bonded to the carbonyl carbon unless decarboxylation or further reaction occurs. The following equation illustrates the reaction involved.

(II)
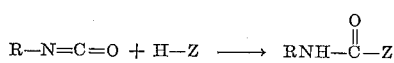

wherein H—Z represents the active hydrogen compound. Thus, by way of illustrations the reaction of isocyanato (—NCO) with (a) hydroxyl (—OH) results in the

group; (b) primary amino (—NH₂) results in the

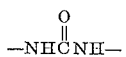

group; (c) secondary amino (—NHR) results in the

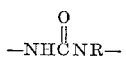

group; (d) thiol (—SH) results in the

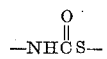

group; (e) carboxyl (—COOH) can be considered to result in the intermediate

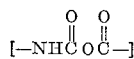

which decarboxylates to the

group; (f) ureylene

results in the

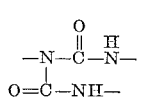

group (biuret); (g) amido

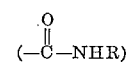

results in the

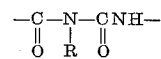

group (carbonylurea); (h) urethane

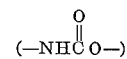

results in the

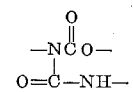

group (allophanate); (i) water (HOH) can be considered to result in the intermediate

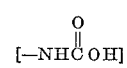

which decarboxylates to the —NH₂ group; and the like. Most desirably, conditions are adjusted so as to achieve a practical and commercially acceptable reaction rate depending, to a significant degree, on the end use application which is contemplated. In many instances, a reaction period of less than a few hours is oftentimes sufficient for the intended use.

The isocyanato-reactive hydrogen reactions, in many instances, are preferably accomplished in the presence of a catalytically significant quantity of one or more of the catalysts illustrated previously. In general, a catalyst concentration in the range of from about 0.001 weight percent, and lower, to about 2 weight percent, and higher, based on the total weight of the reactants, has been observed to be useful.

The concentration of the reactants can be varied over a wide range. Thus, for example, one can employ the active hydrogen compound in such relative amounts that there is provided as low as about 0.1 equivalent (group) of active hydrogen, and lower, per equivalent (group) of isocyanato. In general, about 0.2 and oftentimes about 0.25 equivalent of active hydrogen represent more suitable lower limits. The upper limit can be as high as about 7 equivalents of active hydrogen, and higher, per equivalent of isocyanato. However, for many applications, a desirable upper limit is about 3.5 equivalents of active hydrogen per equivalent of isocyanato. When employing bifunctional compounds (those which contain two active hydrogen substituents such as hydroxyl, carboxyl, primary amino, secondary amino, etc.), a suitable concentration would be from about 0.25 to about 3 equivalents of active hydrogen substituent from the bifunctional compound per equivalent of isocyanato from the isocyanate. It is readily apparent that depending upon the choice and functionality of the active hydrogen compound(s), the choice of the polyisocyanate(s), the proportions of the reactants, etc., there can be obtained a myriad of novel compounds and products which range from the liquid state to solids which can be fusible solids, thermoplastic solids, partially cured to essentially completely cured, thermoset solids, etc.

A class of novel compounds which deserve special mention are those which contain the

grouping therein. These compounds are characterized as follows:

(III)
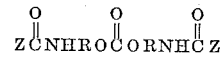

wherein each R has the values set out in Formula I supra, and wherein Z is an abbreviated form for the monofunctional active organic compound sans the active hydrogen atom. Illustrative Z radicals include those which result from the reaction of, for example, stoichiometric quantities of the novel diisocyanates of Formula I supra with monofunctional active organic compounds as illustrated by primary amines, secondary amines, primary alcohols, secondary alcohols, phenols, primary thiols, secondary thiols, imines, amides, ureas, etc. The scope of Z is readily apparent from the description re the active hydrogen compounds as well as from a consideration of Equation II supra. Moreover, by reacting equimolar amounts of the diisocyanates of Formula I with the afore-illustrated monofunctional active organic compounds, there can be obtained monoisocyanates of the formula:

(IV) 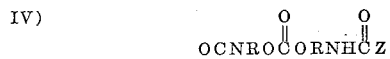

A particular desirable class of novel polyurethane diols which are contemplated within the scope of the teachings of this specification are those which result from the reaction of a dihydroxy compound such as those illustrated previously, with a molar deficiency, i.e., a stoichiometric deficiency, of the diisocyanates which fall within Formula I supra. The highly preferred dihydroxy compounds are the alkylene glycols, the polyether glycols, the polyoxyalkylated diols, the polyester diols, and the initiated lactone polyester diols, especially those dihydroxy compounds which have average molecular weights as low as about 60 and as high as about 7000, and higher. A preferred average molecular weight range is from about 300 to about 5000. The initiated lactone polyester diols which have an average molecular weight of from about 600 to about 4000 are eminently preferred since within this molecular weight range there can be prepared, for example, polyurethane products such as cast resins, thermoplastic products, and elastic fibers which exhibit outstanding peformance characteristics. Equation V below illustrates the linear extension reaction involved:

(V)
HO—A—OH + deficient Q(NCO)₂ ⟶

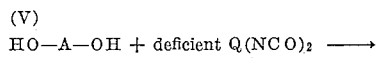

Polyurethane diol wherein HO—A—OH is an abbreviated representation of the organic dihydroxy compounds, the variable A being an organic divalent aliphatic radical such as those illustrated previously; wherein Q(NCO)₂ is an abbreviated representation for the novel diisocyanates encompassed within the scope of Formula I supra, the variable Q representing the divalent unit

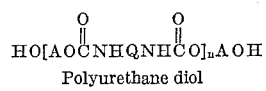

the R variables of said unit having the assigned values of Formula I supra; and wherein $n$ 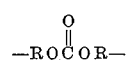 is a number having an average value of at least one.

It will be noted from Equation V that the degree of linear extension is realistically controlled by the amount of the reactants employed. If the proportions of diol and diisocyanate are chosen so that the number of reactive hydroxyl groups on the diol are equal to the number of reactive isocyanate groups on the diisocyanate, then relatively long, high molecular weight chains can be formed. In general, one can employ such relative amounts so that there is provided slightly greater than one equivalent of hydroxyl group from the diol per equivalent of isocyanato group from the diisocyanate. It is desirable, however, to employ amounts of diol and organic diisocyanate (in Equation V) so that there is provided a ratio of from about 1.1 to about 2.2 equivalents, and higher, of hydroxyl group per equivalent of isocyanato group, and preferably from about 1.3 to about 2 equivalents of hydroxyl group per equivalent of isocyanato group.

It is to be understood that in lieu of the dihydroxy compounds employed in Equation V one can employ higher functional polyols such as the triols, tetrols, etc., and obtain novel polyurethane triols, tetrols, etc. In addition, admixtures of dihydroxy compounds, or dihydroxy compounds plus higher functional hydroxy compounds, can be employed.

An eminently preferred class of novel polyurethane diisocyanates which are contemplated are those which result from the reaction of a dihydroxy compound exemplified previously, with a molar excess of the diisocyanates of Formula I supra. The highly preferred dihydroxy compounds which can be employed include those illustrated in the discussion re Equation V supra as well as the resulting polyurethane diol products (of Equation V). Equation VI below illustrates this linear extension reaction involved:

(VI) 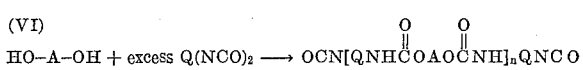

wherein all the variables of Equation VI have the meanings set out in Equation V previously.

It will be noted from Equation VI that the use of an excess of diisocyanate provides an efficient means of control over the degree of linear extension of the polyurethane molecule. If the proportions of diol and diisocyanate are chosen so that the number of reactive terminal hydroxy groups on the diol are equal to the number of reactive isocyanate groups on the diisocyanate, as indicated previously, relatively long, high molecular weight chains would be formed. It is desirable, for many applications, to employ amounts of diisocyanate and diol (in Equation VI) so that there is provided a ratio of greater than about one equivalent of diisocyanate per equivalent of diol, preferably from about 1.05 to about 7 equivalents, and higher, of diisocyanate per equivalent of diol, and preferably still from about 1.2 to about 4 equivalents of diisocyanate per equivalent of diol.

During and after preparation of the isocyanato-terminated reaction products it is oftentimes desirable to stabilize said reaction products by the addition of retarders to slow down subsequent further polymerization or less desirable side-recations such as, for example, allophanate formation. Retarders may be added to the diisocyanate, diol, and/or the aforesaid reaction products. Illustrative of the retarders suitable for the diol-diisocyanate reaction are hydrochloric acid, sulfuric acid, phosphoric acid, boric acid, acetyl chloride, para-toluenesulfonyl chloride, phosphorous trichloride, phosphorous oxychloride, sulfuryl chloride, thionyl chloride, and sulfur dioxide.

In lieu of, or in conjunction with the dihydroxy reactants of Equation V, it is oftentimes desirable to employ higher functional polyols such as the triols, tetrols, etc., and obtain novel polyurethane triisocyanate, tetraisocyanates, etc.

Another particular desirable class of novel compounds which are contemplated are the novel polyurea diamines which are prepared via the reaction of a diamino compound (which contain two groups from the class of primary amino, secondary amino, and mixtures thereof) as illustrated previously with a molar deficiency of the diisocyantes of Formula I. Equation VII below illustrates this linear extension reaction involved:

(VII)
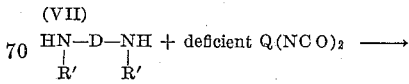 + deficient Q(NCO)₂ ⟶

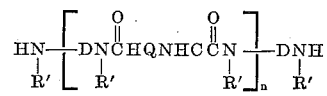

wherein $$HN-D-NH$$
$$\phantom{HN-}|\phantom{D-}|$$
$$\phantom{HN-}R'\phantom{D}R'$$

is an abbreviated representation of a diamine compound (the R' variables representing hydrogen; a monovalent hydrocarbon or azahydrocarbon radical, e.g., alkyl, aryl, aralkyl, azalkyl, and the like, and D representing a divalent organic radical, e.g., a divalent aliphatic, alicyclic, aromatic, or heterocyclic radical), and wherein $Q(NCO)_2$ and $n$ have the meanings set forth in Equation V supra. In general, one can employ slightly greater than about one and upwards to about two, and higher, equivalents of amino group per equivalent of isocyanato group. In lieu of, or in conjunction with, the diamino reactants of Equation VII, it is oftentimes desirable to employ higher functional polyamines such as the triamines, tetraamines, etc., and obtain novel polyurea triamines, polyurea tetraamines, etc.

On the other hand, the use of a molar excess of diisocyanate with relation to the diamino compound produces novel polyurea diisocyanates as illustrated by Equation VIII:

(VIII)

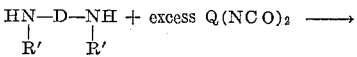

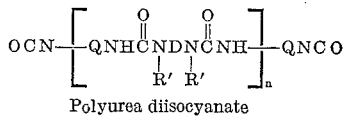

Polyurea diisocyanate

In the reaction exemplified by Equation VIII supra, there can be employed slightly greater than about one and upwards to about 3, and higher, equivalents of isocyanato group per equivalent of amino group. Higher functional polyamines can be employed instead of, or admixed with, the diamines, to thus yield novel polyurea triisocyanates, polyurea tetraisocyanates, etc.

If desired, the preceding novel linear extension reactions can be carried out in the presence of essentially inert normally liquid organic vehicles such as various organic solvents, depending upon the further application which may be intended for said reaction products.

In another aspect, the invention is directed to the preparation of cast polyurethane systems. Highly useful rigid to flexible, polyurethane resins which can range from slightly crosslinked products to highly crosslinked products result from the reaction of the diisocyanates of Formula I supra and/or the polyisocyanato reaction products discussed in the section are Equations VI and VIII with a polyfunctional chain extender which contains at least two functional groups that are primary amino (—NH$_2$), secondary amino (—NHR), hydroxyl (—OH), or mixtures thereof. The polyisocyanate and polyfunctional chain extender are employed in such relative amounts that there is provided at least about one equivalent (group) of isocyanato (—NCO) from the polyisocyanate per equivalent (group) of functional group (hydroxyl and/or amino) from the polyfunctional compounds. When employing solely difunctional compounds as the chain extender(s), it is desirable to employ such relative amounts that result in greater than about one equivalent of —NCO, e.g., at least about 1.02 equivalents of —NCO, from the polyisocyanate per functional group from the difunctional compound. However, it is oftentimes highly satisfactory when employing polyfunctional chain extenders which contain 3 or more functional groups, alone or in admixture with difunctional chain extenders, to employ such relative amounts so that there is provided at least about one equivalent of —NCO from the polyisocyanate per equivalent of functional group from the chain extender(s). Cast polyurethane resins having special utility as printing ink rollers, cast solid urethane, industrial tires, mechanical goods such as seals, O-rings, gears, etc., ladies' shoe heels, and the like, can be prepared from castable formulations which provide from about 1.02 to about 1.6 equivalents of —NCO from the polyisocyanate per equivalent of functional group from the polyfunctional chain extender. Optimum properties result from the highly preferred castable formulations which provide from about 1.05 to about 1.4 equivalents of —NCO per equivalent of function group.

It is further highly desirable that the aforesaid polyisocyanate be a prepolymer as defined in Equation VI supra which has an average molecular weight of at least about 550 in the preparation of cast polyurethane resins. The upper limit can be as high as 8000 and higher. For many applications, a practical molecular weight range is from about 750 to about 5000. It is observed that within the aforesaid molecular weight limits there can be produced cast polyurethane resins which vary from extremely soft flexible products to relatively hard plastic products. Prepolymers which result from the reaction of diisocyanate and the initiated lactone polyester polyols are eminently suitable since cast resins which possess high performance characteristics can be obtained.

Among the polyfunctional chain extenders which can be employed in the castable formulations are those organic compounds exemplified previously which have two or more hydroxyl or amino (primary and secondary) groups including mixtures of such groups such as the polyols (diols, triols, tetrols, etc.), the polyamines (diamines, triamines, etc.), amino alcohols, and the like. Among the polyfunctional chain extenders which deserve special mention because they result in especially useful cast polyurethane resins of high strength, high tear resistance, relatively low permanent set, good solvent resistance, and/or excellent abrasion resistance can be listed the following: 1,4-butanediol, 1,5-pentanediol, 1,6-hexanediol, quinitol, 1,4-bis(2-hydroxyethoxy)benzene, 4,4'-bis[(2 - hydroxyethoxy)phenyl]isopropylidene, trimethylolpropane, triisopropanolamine, ethanolamine, p-aminophenylethyl alcohol, 2,4- and 2,6-toluenediamines, 3,3'-dichloro-4,4'-diphenylenediamine, and 4,4'-methylene bis (o-chloroaniline).

The preparation of the cast polyurethane products can take place over a wide temperature range, e.g., from about room temperature to about 200° C., and higher. The preferred temperature is in the range of from about 50° C. to about 150° C. A highly preferred temperature range is from about 60° C. to about 105° C. The upper limit of the reaction temperature, as indicated previously is realistically controlled by the thermal stability of the reactants and reaction products whereas the lower limit is regulated, to a significant degree, by the reaction rate.

A valuable modification of the cast polyurethane aspect is the use of an admixture containing the polyols exemplified previously with/without the novel polyurethane diols (of Equation V) plus the diisocyanates (of Formula I) instead of, or in conjunction with, the prepolymer (of Equation VI). It is preferred that the previously exemplified polyols be substantially linear hydroxyl-terminated polymers. It is highly preferred that these polymers have an average molecular weight of at least about 60 and upwards to 6000, and higher, and preferably from about 300 to about 5000. The hydroxyl-terminated polymers which are eminently suitable include the alkylene glycols, the polyether glycols, the polyester diols, the polyoxyalkylated diols, and the initiated lactone polyester diols. In this modification, the ratios of the equivalents of —NCO and the equivalents of functional groups are the same as set forth above. It is understood, of course, that these ratios will include all the NCO groups and all the functional groups in the castable formulation regardless of the source. Thus, for example, if the formulation comprises novel polyurethane diol, novel diisocyanate, and alkanediol, one must take into consideration when computing the equivalents ratio of said formulation the equivalents of —NCO from the diisocyanate with relation to the sum of the equivalents of the hydroxyl groups from the polyurethane diol plus alkanediol.

A further desirable modification of the cast polyurethane aspect is directed to the partial or incomplete reaction of the cast formulation to thus produce a thermoplastic reaction product mass which contains unreacted or free isocyanato groups. The aforesaid thermoplastic mass is relatively stable or non-reactive at room temperature, e.g., about 20° C., but possesses the characteristic of being further cured as, for example, by curing same at an elevated temperature for a sufficient period of time. This curable, isocyanato-containing mass can be prepared by heating the cast formulation or system, e.g., to about 100° C., and higher, and thereafter quenching the resulting partial reaction products (which contain a minor proportion of unreacted isocyanato groups) with an inert fluid in which said reaction products are insoluble, e.g., an inert normally liquid organic non-solvent. The aforesaid curable, isocyanato-containing thermoplastic mass can be stored for relatively long periods of time or shipped to customers over great distances without undergoing any appreciable reaction at ambient conditions, e.g., about 20° C.

An extremely significant aspect is directed to the preparation of thermoplastic polyurethane resins including curable polyurethane systems. Such useful systems and/or resins can be prepared from formulations (which include the reactants, expecially the difunctional reactants, reaction conditions, and modifications thereof) as set out in the preceding aspect (re the cast polyurethanes) with the exception that there is employed at least about one equivalent of functional group, e.g., hydroxyl, primary amino, secondary amino, or mixtures thereof, from the polyfunctional chain extender per equivalent of isocyanato (—NCO) from the isocyanate source. In general, a practical upper limit would be about 1.5 equivalents of functional group per equivalent of —NCO. Preferred formulations contain from about 1.02 to about 1.3 equivalents of functional group per equivalent of —NCO, preferably still from about 1.05 to about 1.15 equivalents of functional group per equivalent of —NCO. In other modifications, it is eminently preferred that the thermoplastic formulation contains about one equivalent of functional group per equivalent of isocyanato, especially to prepare thermoplastic elastomers which exhibit high performance characteristics.

The thermoplastic and curable polyurethane resins can be cured or crosslinked with an organic polyisocyanate. In this respect the diisocyanates of Formula I supra, the novel polyisocyanato-containing polymers exemplified previously, and/or polyisocyanates well known in the literature can be employed, e.g., publication by Siefken [Annalen, 562, pages 122–135 (1949)]. Polyisocyanates such as those produced by the phosgenation of the reaction products of aniline and formaldehyde or p,p',p''-triphenylmethane triisocyanate, represent further illustrations.

In general, the cure can be effected by using an amount of polyisocyanate which is in stoichiometric excess necessary to react with any free or unreacted functional group from the polyfunctional chain extender. In general, from about 1 to about 10 parts by weight of additional polyisocyanate per 100 parts by weight of curable polyurethane resin is adequate to accomplish the cure for most applications. A preferred range is from about 2.5 to about 6 parts by weight of polyisocyanate per 100 parts of curable stock. The additional polyisocyanate can be admixed with the curable polyurethane stock on a conventional rubber mill or in any suitable mixing device and the resulting admixture is cured in the mold at an elevated temperature, e.g., from about 125°–160° C., in a relatively short period, e.g., a few minutes, or longer. In the mold, the cure is accomplished apparently by a reaction of excess amino or hydroxyl groups with the newly admixed polyisocyanate, and secondly by reaction of the remaining free terminal isocyanato groups with hydrogen atoms of the urea and urethane groups to form a crosslinked resin. By this procedure, there can be obtained cured polyurethane products which range from highly elastomeric materials possessing excellent tensile strength and exceptional low brittle temperature to tough, rigid rubbery materials.

Various modifying agents can be added to the castable or curable formulations among which can be listed fillers such as carbon blacks, various clays, zinc oxide, titanium dioxide, and the like; various dyes; plasticizers such as polyesters which do not contain any reactive end-groups, organic esters of stearic and other fatty acid, metal salts of fatty acids, dioctyl phthalate, tetrobutylthiodisuccinate; glass; asbestos; and the like.

A modification of the thermoplastic and curable polyurethane resins is the preparation of formulations using diisocyanates which are well known in the literature, and subsequently effecting the cure with the polyisocyanates of Formulas I or VI.

A particularly preferred aspect is directed to the preparation of elastomeric products, especially elastomeric films and elastic fibers. It has been discovered, quite surprising indeed, that there can be prepared exceptional elastic polyurethane films and fibers which are derived from substantially linear hydroxyl terminated polymers having an average molecular weight greater than about 500 and the diisocyanates of Formula I supra. The elastic films and fibers of this aspect are characterized by outstanding resistance to sunlight degradation, outstanding elongation, high resistance to fume aging, i.e., resistance to breakdown caused by nitrous oxide which is commonly found as an impurity in the atmosphere, high tensile and modulus properties, and/or good stability to oxidizing agents such as chlorine bleach.

These novel elastomeric films and fibers can be prepared by first reacting the aforesaid substantially linear hydroxyl-terminated polymer with a molar excess of the novel diisocyanate (of Formula I) to produce a substantially linear isocyanato-terminated polyurethane product (known as a "prepolymer"). The chain extension reaction of said prepolymer with a bifunctional curing compound in accordance with, for instance, well known cast or spinning techniques results in elastomeric films or fibers as may be the case. In a useful embodiment, the aforesaid substantially linear hydroxyl-terminated polymers can be linearly extended by reaction with a molar deficiency of an organic diisocyanate to yield substantially linear hydroxyl-terminated polyurethane products then can be reacted with a molar excess of the novel diisocyanates to obtain the prepolymer.

The substantially linear hydroxyl-terminated polymer possesses an average molecular weight of at least about 500, more suitably at least about 700, and preferably at least about 1500. The upper average molecular weight can be as high as 5000, and higher, a more suitable upper limit being about 4000. For many of the novel elastic fibers and films which exhibited a myriad of excellent characteristics, the average molecular weight of the starting hydroxyl terminal polymer did not exceed about 3800. In addition, the hydroxyl-terminated polymers possess a hydroxyl number below about 170, for example, from about 20 to about 170; and a melting point below about 70° C., and preferably below about 50° C.

Exemplary of the substantially linear hydroxyl-terminated polymers which are contemplated include the alkylene glycols, the polyether glycols, the polyoxyalkylated diols, the polyester diols, and the initiated lactone polyester diols. The initiated lactone polyester diols are eminently preferred since elastomeric films and elastic fibers exhibiting outstand performance characteristics can be obtained. Of the highly preferred initiated lactone polyester diols are included those which are characterized by at least about 50 mol percent of carbonylpentamethyleneoxy units therein

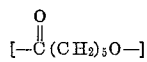

and which possess an average molecular weight of from about 500 to about 5000, particularly from about 600 to about 4000. The remaining portion of the molecule can be comprised of, in addition to the initiator, essentially linear units derived from a cyclic carbonate such as those illustrated previously, e.g., 4,4-dimethyl-2,6-dioxacyclohexanone, 4,4 - dicyanomethyl - 2,6 - dioxacyclohexanone, 4,4 - dichloromethyl - 2,6 - dioxacyclohexanone, 4,4-di(methoxymethyl) - 2,6 - dioxacyclohexanone, and the like; an oxirane compound especially ethylene oxide, 1,2-epoxypropane, the epoxybutanes, etc.; a mono-, di-, and/or trialkyl-epsilon-caprolactone such as the monomethyl-, dimethyl-, trimethyl-, monoethyl-, diethyl-, triethyl-epsilon-caprolactones, and others exemplified supra; an alpha, alpha-dialkyl-beta-propiolactone such as alpha, alpha-dimethyl-beta-propiolactone; an alpha, alpha-dihaloalkyl-beta-propiolactone as illustrated by alpha, alpha - dichloromethyl - beta - propiolactone; and others. Also highly preferred polymeric diols include the so-called initiated lactone homopolyester diols which are prepared via the reaction of an admixture of epsilon-caprolactone and an initiator which contains two groups from the class of hydroxyl, primary amino, secondary amino, and mixtures thereof, in the presence of a catalyst such as stannous dioctanoate or stannic tetraoctanoate.

Illustrative of the polyether glycols which are contemplated include those illustrated previously as well as those illustrated in column 7, lines 19 through 70, of U.S. Patent No. 2,929,804 which patent is incorporated by reference into this disclosure. Many of the polyester diols which are encompassed have been exemplified previously. Others are set forth in columns 4–5 of U.S. Patent No. 3,097,192 which patent is incorporated by reference into this disclosure. The initiated lactone polyester diols have been thoroughly illustrated previously; others are disclosed in U.S. Patent Nos. 2,878,236, 2,890,208, 2,914,556, and 2,962,524 which patents are incorporated by reference into this disclosure. The polyurethane diols of Equation V also represent a preferred group of substantially linear hydroxyl-terminated polymers.

The minimization or elimination of crystallinity, if present in the hydroxyl-terminated polymer, can be achieved, as oftentimes is desired, by introducing pendant groups and/or unsymmetrical groups in the polymeric chain as illustrated by lower alkyl groups, e.g., methyl, ethyl, isopropyl, etc.; halo, e.g., chloro, bromo, etc.; ortho-tolylene; and similar groups which do not interfere with the subsequent polymerization under the conditions used. As is readily apparent to those skilled in the art, the choice of the proper reactants will readily yield hydroxyl-terminated polymers with the desired quantity and type of pendant and/or unsymmetrical groups. Along this vein, polymers of desired molecular weight and melting point can thus be obtained. In addition, the polymer chain can be interrupted with divalent keto, urea, urethane, etc., groups.

The hydroxyl-terminated polymer and diisocyanate can be reacted in such proportions so as to produce either a hydroxyl-terminated polyurethane product or an isocyanato-terminated polyurethane product (prepolymer). A molar ratio of diol to diisocyanate greater than one will yield the hydroxyl-terminated polyurethane whereas a molar ratio less than one will result in the prepolymer.

As indicated previously, in a particularly useful embodiment, there is employed a sufficient molar excess of hydroxyl-terminated polymer, in particular, the initiated lactone polyester diols, with relation to the organic diisocyanate so that there results substantially linear hydroxyl-terminated polyurethane products which have average molecular weights of from about 1200 to about 5000, and preferably from about 1500 to about 3800.

The hydroxyl-terminated polymers or the above said hydroxyl-terminated polyurethane products then are linearly extended with the diisocyanates of Formula I. This reaction can be carried out by employing a molar ratio of diisocyanate to hydroxyl-terminated compound of from about 1.1:1 to about 5:1 preferably from about 1.5:1 to about 3.5:1, and more preferably from about 2:1 to 2.5:1.

In the preparation of the hydroxyl-terminated polyurethane products or the prepolymer, the reaction temperature can vary over a broad range such as noted for the isocyanato/active hydrogen (hydroxyl in this instance) section discussed previously. Of course, the optimum reaction temperature will depend, to a significant degree, upon several variables such as the choice of reactants, the use of a catalyst, the concentration of the reactants, etc. A suitable temperature range is from about 20° C. to about 125° C., and preferably from about 50° C. to about 100° C. The reaction time likewise is largely influenced by the correlation of the variables involved, and can vary from a few minutes to several hours, e.g., from about 0.5 to about 5 hours, and longer. The tertiary amine compounds and/or the organic metal compounds disclosed in the section which discusses the isocyanato/active hydrogen reactions can be employed as catalysts, if desired. The isocyanato/hydroxyl reactions are suitably carried out in the absence of an inert normally liquid organic vehicle, though one can be employed, if desired.

In the next step, the prepolymer which results from the about discussed isocyanato/hydroxyl reaction is reacted with a bifunctional curing compound which possesses two groups that are reactive with isocyanato groups. Examples of such curing compounds include diamines, diols, amino alcohols, hydrazino compounds, e.g., hydrazine, water, and the like. It is preferred that said curing compound have two reactive groups from the class of alcoholic hydroxyl, primary amino, and second amino. The most preferred reactive group is primary amino. It is to be understood that primary amino (—NH₂) and secondary amino (—NHR) iclude those compounds in which the nitrogen of these amino groups is bonded to a carbon atom as in, for example, ethylenediamine, as well as those compounds in which said nitrogen (of these amino groups) is bonded to another nitrogen atom as in, for instance, hydrazine.

The bifunctional curing compounds have been illustrated previously in the discussion of the active hydrogen compounds. Among the more desirable diamines (which term includes the mono- and polyalkylene polyamines which have two and only two primary and/or secondary amino groups) are such compounds as ethylenediamine, 1,2- and 1,3-propylenediamine, tetramethylenediamine, pentamethylenediamine, hexamethylenediamine, the cyclohexylene diamines, the phenylenediamines, the tolylenediamines, 4,4'-diaminodiphenylmethane, m- and p-xylylenediamine, 3,3' - dichloro - 4,4' - diaminophenylmethane, benzidine, 1,5-diaminonaphthalene, piperazine, 1,4-bis(3-aminopropyl)piperazine, trans - 2,5 - dimethylpiperazine, and the like.

It is preferred that the diamine contain no groups other than the two reactive amino groups that are reactive with isocyanato. The said diamine can have various substituent groups including chloro, bromo, alkoxy, alkyl, and the like. Generally it is also preferred that the diamine have not more than 15 carbon atoms.

Illustrative of the various diols and amino alcohols include those exemplified previously and, in particular, ethylene glycol, propylene glycol, 2,2-dimethyl-1,3-propanediol, paradibenzyl alcohol, 1,4-butanediol, ethanolamine, isopropanolamine, and the like. Water and hydrazine are also useful bifunctional curing agents. The organic diamines are the preferred curing compounds, with the alkylenediamines being more preferred, and ethylenediamine being most preferred.

The ratio of reactants in the curing step can vary from about 0.8 to about 1.5 equivalents of isocyanato from the prepolymer per equivalent of functional group from the bifunctional curing compound. In many cases, it is desirable to employ approximate stoichiometric proportions of prepolymer and curing compound, i.e., in proportions such that there is present approximately one isocyanato group from the polymer per reactive group from the difunctional curing compound. Oftentimes, it is desirable to employ a slight stoichiometric excess of prepolymer, e.g., greater than about one equivalent and upwards to about 1.4 equivalents of isocyanato per equivalent of functional group (from the bifunctional curing compound), and preferably from about 1.05 to about 1.2 equivalents of isocyanato per equivalent of functional group.

A preferred method for carrying out the reaction of prepolymer with curing compound is to effect the reaction in an inert normally liquid organic solvent and thus form a solution from which the elastic fibers and films of the invention can be produced by conventional solution spinning and casting techniques. This can be done by dissolving the prepolymer in a solvent to make, for example, from about 5 to about 40 weight percent solid solution (percent based on total solution weight), and then adding the bifunctional curing compound to this solution. The addition will be facilitated if the curing compound is also dissolved in the same solvent. Many solvents can be used for this purpose. The essential requirement is that the solvent be non-reactive with the prepolymer and with the curing compound. Examples of useful solvents include acetone, dimethyl sulfoxide, N,N-dimethylformamide, N,N-dimethylacetamide, tetrahydrofuran, and the like. N,N-dimethylformamide is a preferred solvent. Acetone alone or in admixture with other organic vehicles such as those illustrated above represent, by far, the most preferred solvents from commercial and economic standpoints. In this respect, it should be particularly noted that commercial polyurethane fibers prepared from aromatic diisocyanates, e.g., p,p'-methylenediphenyl diisocyanate (MDI), cannot be spun or cast from an acetone system. In lieu thereof, the universal solvent for the aforesaid commercial polyurethane fibers is the expensive dimethylformamide.

The reaction between the prepolymer and the curing compound takes place readily at room temperature. Therefore, the solution can be spun into a fiber or cast into a film within a relatively short period, e.g., a few minutes, after the curing compound has been added. For example, the solution can usually be cast or spun within 10 minutes after the addition of a diamine to the prepolymer when the reactants are at a temperature of about 25° C. In making fibers, the polymer solution can be spun into a water bath, or dry spun, via conventional techniques. Liquids other than water can be employed in the bath, if desired, but water is generally preferred for economic reasons. Ethylene glycol, glycerol, and the like are illustrative of such other liquids. The temperature of the bath can be varied over a range of, for instance, 25° C. to 150° C. The fiber is recovered from the bath by conventional techniques, and can be given a post-cure to oftentimes enhance certain of the properties. A cure at elevated temperatures, for example, up to about 125° C., and higher, for periods ranging from several minutes to several hours may be desirable in many instances. For the preparation of fibers, the cure can be conducted for a period, for example, as long as five hours whereas the cure can be increased to 16 hours, and longer, for the preparation of films. In any event, the cure, if desired, can be varied in duration to obtain the desired and optimum properties in the final product. Conventional solution casting techniques can be employed in making films.

If gelation should occur during the reaction between the prepolymer and the curing compound in the solvent, it is oftentimes desirable to add a small amount of acid to the prepolymer solution preferably before the curing compound is added. By so doing, the storage life of the solution containing the reaction product of prepolymer and curing compound can be increased significantly, for example, from a storage life in some cases of only a few minutes without the acid to a storage life of up to about several days with the acid. The acid is used in small amounts. For instance, from about 0.005, and lower, weight percent to about 0.6 weight percent of the acid, and higher, based on the weight of the prepolymer, has been found to be suitable.

Laboratory tests have shown that the following acids and acid-forming compounds are oftentimes useful for the purpose described in the preceding paragraph: phosphoric acid, phosphorous acid, hydrochloric acid, nitric acid, sulfuric acid, benzoyl chloride, benzene sulfonyl chloride, benzenesulfonic acid, dichloroacetic acid, octylphenyl acid phosphate, stearyl acid phosphate, and boron trifluoride-etherate. It is to be noted that the $pK_{A'}$ of each of the above mentioned acids is less than about 2.5. (The term $pK_{A'}$ refers to the negative of the $\log_{10}$ of the hydrogen ion ionization constant in aqueous solution.) The strong mineral acids which have a $pK_{A'}$ less than about 2.5 represent a preferred subclass. Phosphoric acid is the preferred species.

The characteristics of the novel fibers and films can be varied over a wide range depending, to a significant degree, on the choice and proportion of the hydroxyl terminated polymers (diol), the diisocyanate source, and bifunctional curing compound, the reaction conditions, etc. The novel fibers and films can range from semi-elastic to highly elastic. A uniqueness which should be stressed is the over-all combination of properties which oftentimes can be obtained such as would result from fibers prepared via the reaction of lactone polyester diol, CDI, and 2,5-dimethylpiperazine. The molecular weights of the resulting novel elastomeric fibers and films are somewhat difficult to ascertain with exactness. Nevertheless, they are sufficiently high enough so that significant semi-elastic and elastic properties in the film- and fiber-forming ranges result.

The novel elastic and semi-elastic polymers are highly useful compositions. For instance, in the form of fibers, the polymers can be used to make foundation garments, bathing suits, sporting cloths, elastic waist bands, hose, and the like. In the form of films, the polymers can be employed as elastic sheeting, as "rubber bands," and the like.

Another highly significant aspect of the invention is the use of the diisocyanates of Formula I and/or the novel prepolymers to prepare foams, e.g., polyurethane foams, which can range from the extremely flexible to the highly rigid state. The prepolymers which are contemplated in this aspect are the polyisocyanato-containing reaction products which result from the reaction of polyfunctional compounds which contain two or more active hydrogen substituents as described previously., e.g., diols, triols, tetrols, diamines, triamines, amino alcohols, etc., with the novel diisocyanates of Formula I. The proportions of the reactants are such that a sufficient stoichiometric excess of diisocyanates with relation to the polyfunctional compound is employed, i.e., the equivalents of —NCO from the diisocyanate with relation to the equivalents of active hydrogen substituent from the poly-functional compound is greater than one to thus give non-cross-linked polyisocyanato-containing reaction products (containing at least two —NCO groups) which are soluble in various common organic vehicles, e.g. benzene. Eminently desirable non-yellowing flexible foams can be prepared via the so-called "one step" method which involves reacting a polyhydroxy compound, preferably one that contains at least three alcoholic hydroxyl groups, with the above-illustrated novel polyisocyanates, in the presence of a blowing agent such as water, a liquefied gas, and the like. It is desirable to conduct the reaction in the presence of a catalyst and surfactant. The preparation of the rigid foams differs from the preparation of the flexible foams in that it is generally preferred to first prepare what is oftentimes referred to as a "quasi prepolymer," and subsequently add thereto the remainder of the polyhydroxy compound, blowing agent, and other ingredients, if employed, e.g., catalyst, surfactant, etc.

A wide scope of polyhydroxy compounds can be employed. The preferred polyhydroxy compounds are those which contain three or more hydroxy groups. Illustrative polyhydroxy compounds include the following classes of compounds (as well as those illustrated previously in this specification):

(a) The polyhydroxy initiated lactone polyesters, and the alkylene oxide adducts thereof;

(b) The polyester polyols (including the polyester diols), and the alkylene oxide adducts thereof;

(c) The polyhydroxyalkanes and polyhydroxycycloalkanes, and the alkylene oxide adducts thereof;

(d) The trialkanolamines, and the alkylene oxide adducts thereof;

(e) The polyols derived from polyamines by the addition of alkylene oxides thereto;

(f) The non-reducing sugars and sugar derivatives, and the alkylene oxide adducts thereof;

(g) The alkylene oxide adducts of aromatic amine/phenol/aldehyde ternary condensation products;

(h) The alkylene oxide adducts of phosphorus and polyphosphorus acid, and various hydroxyl-terminated phosphites and phosphonates;

(i) The alkylene oxide adducts of polyphenols;

(j) The polytetramethylene glycols;

(k) The functional glycerides, such as castor oil;

(l) The polyhydroxyl-containing vinyl polymers; and the like.

The "preferred alkylene oxides" which term will be employed hereinafter include ethylene oxide, 1,2-epoxypropane, 1,2-epoxybutane, 2,3-epoxybutane, isobutylene oxide, epichlorohydrin, and mixtures thereof.

Illustrative polyhydroxyalkanes and polyhydroxycycloalkanes include among others, ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,5-, 1,6-, and 1,8-dihydroxyoctane, 1,10-dihydroxydecane, glycerol, 1,2,5-trihydroxybutane 1,2,6-trihydroxyhexane, 1,1,1-trimethylolethane, 1,1,1-trimethylolpropane, pentaerythritol, xylitol, arabitol, sorbitol, mannitol, and the preferred alkylene oxide adducts thereof.

Exemplary trialkanolamines include triethanolamine, triisopropanolamine, and the tributanolamines, and the preferred alkylene oxide adducts thereof.

Among the alkylene oxide adducts of polyamines can be listed the adducts of the preferred alkylene oxides with ethylenediamine, diethylenetriamine, triethylenetetramine, 1,3-butanediamine, 1,3-propanediamine, 1,4-butanediamine, 1,2-, 1,3-, 1,4-, 1,5-, and 1,6-hexanediamine, phenylenediamines, toluenediamine, naphthalenediamines, and the like. Illustrative of the resulting adducts which are of particular interest include, N,N,N',N'-tetrakis(2-hydroxyethyl)ethylenediamine, N,N,N',N' - tetrakis(2 - hydroxypropyl)ethylenediamine, N,N,N',N'-N''-pentakis(2-hydroxypropyl)diethylenetriamine, phenyldiisopropanolamine, and the like. Others which deserve particular mention are the preferred alkylene oxide adducts of aniline or substituted-aniline/formaldehyde condensation products.

Illustrative of the non-reducing sugars and sugar derivatives contemplated are sucrose; the alkyl glycosides such as methyl glucoside, ethyl glucoside, and the like; the polyol glycosides such as ethylene glycol glucoside, propylene glycol glucoside, glycerol glucoside, 1,2,6-hexanetriol glucoside, and the like; and the preferred alkylene oxide adducts thereof.

Preferred alkylene oxide adducts of polyphenols include those in which the polyphenol can be bisphenol A; bisphenol F; the condensation products of phenol and for maldehyde, more particularly the novolac resins; the condensation products of various phenolic compounds and acrolein, the simplest members of this class being the 1,1,3-tris(hydroxyphenyl)propanes; the condensation products of various phenolic compounds and glyoxal, glutaraldehyde, and other dialdehydes, the simplest members of this class being the 1,1,2,2-tetrakis(hydroxyphenyl)ethanes, and the like.

Another suitable class of polyhydroxy compounds include the preferred alkylene oxide adducts of aromatic amine/phenol/aldehyde ternary condensation products. The ternary condensation products are prepared by condensing an aromatic amine, for instance, aniline, toluidine, or the like, a phenol such as phenol, cresol, or the like; and an aldehyde preferably formaldehyde; at elevated temperatures in the range of, for example, from about 60° C. to 180° C. The condensation products are then recovered and reacted with said preferred alkylene oxide, using a basic catalyst (e.g., potassium hydroxide), if desired, to produce the polyols. The propylene oxide and mixed propylene-ethylene oxides adducts of aniline/phenol/formaldehyde ternary condensation products deserve particular mention.

The preferred alkylene oxide adducts of phosphorus and polyphosphorus acids are another useful class of polyols. Phosphoric acid, phosphorous acid, the polyphosphoric acids such as tripolyphosphoric acid, and the like, are desirable for use in this connection. Also useful are phosphites such as tris(dipropylene glycol) phosphite and the phosphonates which can be produced therefrom by heating in the presence of, e.g., butyl bromide, as well as the alkylene oxide adducts thereof.

Another useful class of polyols are the polytetramethylene glycols, which are prepared by polymerizing tetrahydrofuran in the presence of an acidic catalyst.

Also useful are castor oil and alkylene oxide adducts of castor oil.

Another useful class of polyols are various polymers that contain pendant hydroxyl groups. Illustrative are poly-vinyl alcohol, vinyl chloride-vinyl alcohol copolymers, and other copolymers of various ethylenically unsaturated monomers and vinyl alcohol. Also useful are polymers formed by reacting a dihydric phenol [for instance, 2,2-bis(4-hydroxyphenyl)propane] with epichlorohydrin in the presence of sodium hydroxide, such as the polymers disclosed in U.S. Patent No. 2,602,075.

The polyhydroxy compound, including mixtures thereof, employed in the foam formulation can have hydroxyl numbers which vary over a wide range. In general, the hydroxyl numbers of these polyols can range from about 20, and lower, to about 1000, and higher, preferably from about 30 to about 600, and more preferably from about 35 to about 450.

The functionality and the hydroxyl number of the polyhydroxy compound are significant factors which enter into consideration in the preparation of foams. Thus, the polyol preferably possesses a hydroxyl number of from about 200 to about 800 when employed in rigid foam formulations, from about 50 to about 250 for semiflexible foams, and from about 20 to about 70, or more, when employed in flexible foam formulations. Such limits are not intended to be restrictive, but are merely illustrative of the large number of possible combinations.

In general, it is desirable to employ at least about one —NCO equivalent (group) per hydroxyl equivalent (group) in the preparation of the urethane foamed product. As a practical matter, a slight excess of —NCO equivalents with relation to the hydroxyl equivalents is oftentimes employed. For optimum properties, those skilled in the art can readily determine the desired concentration of the reactants. Factors which will influence the concentration are the choice and functionality of the reactants, the end product—whether flexible or rigid, the choice of the blowing agent, the use of a catalyst and/or surfactant, and other considerations.

As indicated previously, various blowing agents such as water and halogenated hydrocarbons can be employed in the preparation of the foams. The preferred blowing agents are water and certain halogen-substituted aliphatic hydrocarbons which have boiling points between about −40° C. and 70° C., and which vaporize at or below the temperature of the foaming mass. Illustrative are, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1-1-difluoro-1,2,2-trichloroethane, chloropentafluoroethane, 1-chloro-1-fluoroethane, 1-chloro-2-fluoroethane, 1,1,2 - trichloro-1,2,2 - trifluoroethane, 1,1,1-trichloro - 2,2,2 - trifluoroethane, 2-chloro-1,1,1,2,3,3,4,4,4-nonafluorobutane, hexafluorocyclobutene and octafluorocyclobutane. Other useful blowing agents include low-boiling hydrocarbons such as butane, pentane, hexane, cyclohexane, and the like. Many other compounds easily volatilized by the exotherm of the isocyanato-hydroxyl reaction also can be employed. A further class of blowing agents includes thermally unstable compounds which liberate gases upon heating, such as N,N'-dimethyl-dinitrosoterephthalamide.

The amount of blowing agent used will vary with the density desired in the foamed product. In general it may be stated that for 100 grams of reaction mixture containing an average isocyanato/reactive ratio of about 1:1, about 0.005 to 0.3 mol of gas are used to provide densities ranging from 30 to 1 pounds per cubic foot, respectively.

In producing foamed reaction products, it is also within the scope of the invention to employ small amounts, e.g., about 0.001% to 5.0% by weight, based on the total reaction mixture, of an emulsifying agent such as a polysiloxane-polyoxyalkylene block copolymer having from about 10 to 80 percent by weight of siloxane polymers and from 90 to 20 percent by weight of alkylene oxide polymer, such as the block copolymers described in U.S. Patents 2,834,748 and 2,917,480. Another useful class of emulsifiers are the "non-hydrolyzable" polysiloxane-polyoxyalkylene block copolymers, such as those described in U.S. 2,846,458. This class of compounds differs from the above-mentioned polysiloxane-polyol-oxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Other useful emulsifiers and surfactants include such materials as dimethyl silicone oil, polyethoxylated vegetable oils commercially available as "Selectrofoam 6903," "Emulphor EL-720," and others. Although the use of an emulsifier is desirable to influence the type of foam structure that is formed, the foam products of the invention can be prepared without emulsifiers in some cases.

The use of catalysts is generally desirable in the preparation of the novel foamed compositions. Among the catalysts which are contemplated include the tertiary amines, the phosphines, the organic metal compounds, and mixtures thereof, discussed supra with regard to the catalysis of the isocyanato/active hydrogen reactions. It is extremely advantageous to employ a combination of the tertiary amine compound and the organic tin compound as catalysts in the foam formulation. The catalyst is used in catalytically significant quantities. For instance, concentrations in the range of from about 0.001 weight percent, and lower, to about 2 weight percent, and higher, based on the total foam ingredients, have been found useful.

The techniques for producing polyurethane foams by the one shot, prepolymer, or semi-prepolymer methods are well known in the art, as is exemplified by the Saunders et al. text, cited above.

In some cases it is desirable to add a small quantity, e.g., up to 5 parts per 100 parts by weight of polyol, of a dipolar aprotic solvent such as formamide, N,N-dimethylformamide, or dimethyl sulfoxide to the foaming formulation. This serves to "open up" the cell structure when there is an undesired tendency to form closed-cell foams.

A further aspect of the invention is directed to the preparation of novel laminates and/or reinforced plastic materials which exhibit outstanding and extraordinary characteristics. The novel laminates and reinforced plastic materials exhibit high impact resistance, superior weathering properties, good dye receptivity, etc. Moreover, the novel laminates, in many respects, exhibit superior properties at elevated temperatures than those prepared from conventional polyesters. Though reinforced plastics prepared from such conventional polyesters enjoy commercial success, the use of polyurethane and/or polyurea systems in the subject field represents relatively new technology that does not appear to have been successfully commercialized to any noticeable extent.

The most common reinforcing material is glass, generally in the form of chopped fibers or as woven glass cloth. The invention pertains, also, to other reinforcing material which are set forth in the well documented polyester laminating art. In general, a glass fiber or mat is placed in the reinforcing formulation explained hereinafter in such a manner as to essentially eliminate all trapped gases. The glass mat is often placed layer upon layer whereas the glass fiber can be dispersed in a predetermined set pattern, if desired. The formulation then can be cured in a heated mold, generally at superatmospheric pressure.

The reinforcing formulation can comprise (1) the polyisocyanates illustrated in Formulas I, VI, and/or VIII, and (2) a polyfunctional active hydrogen compound (especially those which contain at least two groups from the class of hydroxyl, primary amino, and secondary amino, or mixture of such groups). The proportions of the ingredients are such that the formulation will result in a cross-linked resin under the curing conditions. The conditions and techniques employed in the conventional polyester laminating art are translatable in this respect. The above ingredients as well as the proportion of the ingredients have been illustrated throughout the specificaion. The afore-described novel reinforcing formulation is, of course, useful per se, that is, without the incorporation of glass therein.

Another aspect of the invention is directed to the preparation of novel adhesive formulations which exhibit superior bond strength, no discernible "creeping," etc. These adhesive formulations can be used to bond metal to metal surfaces, fiber to rubber surfaces (such as in tire cords), cellulosic (such as wood) to cellulosic surfaces, cellulosic to metal surfaces, cellulosic to rubber surfaces, and others.

Chemically speaking, the novel adhesive formulations can comprise the polyisocyanates exemplified by Formulas I, VI, and/or VIII, with/without synthetic or natural rubber admixed therewith. Further desirable novel adhesive formulations comprise the novel blocked products illustrated by Formulas III and IV.

In general, it should be noted that practically all of the novel aspects or embodiments described herein can be employed as adhesives when properly applied. The application of adhesive formulations is adequately covered in the literature; however, illustrative general procedures are as follows: (1) a solution comprising the polyisocyanates of Formula I with/without rubber in an inert normally-liquid organic vehicle is coated on the metal, fabric, wood, etc., surface. Curing is then effected at room temperature. (2) A solution comprising the novel polyisocyanato polymeric products discussed in the sections are Formulas VI and VIII, etc., in an inert normally-liquid organic vehicle is applied to the surface to be bonded and then exposed to air for several minutes, e.g., 10 to 15 minutes. The vehicle thus evaporates and moisture from the air initiates the cure. The surfaces then are joined under moderate pressure and cured at room temperature or temperatures up to 200° C. (3) A solution comprising the novel products illustrated by Formulas III and IV contained in an inert normally liquid organic vehicle are supplied to the surface(s) to be bonded. The solvent is allowed to evaporate to form a slight tacky surface. Thereafter the cure is effected under pressure and/or elevated temperatures.

Extremely useful aspects of the invention are directed to the preparation of novel coatings. Such coatings include the one package moisture cure, the two package heat cure, the oil modified system and the blocked isocyanate technique.

In the one package moisture cure, there is dissolved in an inert normally liquid organic vehicle a polyisocyanate such as illustrated by Formulas I, VI, and/or VIII. The resulting solution then is painted on the substrate to be coated. Curing is effected by reaction of the isocyanate group with moisture from the air to form urea linkages. The carbon dioxide which is formed is diffused through the thin coating. The coating can be either tightly or loosely cross-linked, depending on the mechanical properties desired. The quantity of polyisocyanate in the vehicle is readily controlled by the formulator. A prepolymer system is preferred.

In the two-package heat cure, the polyisocyanates described throughout this specification are reacted, either in an inert normally liquid organic vehicle or neat, with a polyfunctional compound which preferably contains hydroxy, primary amino, and/or secondary amino groups. The polyfunctional compounds which contain at least two hydroxyl groups are preferred. Such compounds would also include, for example, the polyurethane polyols discussed in the section re Formula V supra. The ratio of NCO/active hydrogen is generally about one, although it can be greater than or less than one, e.g., about 0.8, and lower, to about 1.2, and higher. When the NCO/active hydrogen ratio is greater than one, the excess NCO reacts, at elevated temperatures, or in the presence of a catalyst such as dibutyltin dilaurate, with the urethane or urea groups in the molecule to form allophanate or biuret groups, respectively.

The two package heat cure systems get their name from the obvious fact that the art employs two packages. Thus, one package can comprise the polyisocyanate source, such as the novel prepolymers, generally contained in an inert normally liquid organic vehicle, whereas the second package can contain, for example, the polyol source in the inert vehicle. The inert vehicle can be esters, ethers, ketones, hydrocarbons providing, of course, they do not interfere or react with the —NCO groups. Either package could contain other ingredients such as catalyst, etc. Any of the polyisocyanates described previously can be employed in the two package coating systems. The polyfunctional compounds, especially the preferred polyhydroxy compounds, have been adequately illustrated supra.

In the oil-modified system, the hydroxyester of a drying-oil acid is reacted with any of the afore-described polyisocyanates and then air cured through the drying-oil portion of the molecule.

In the blocked isocyanate systems, a "blocked" or "partially blocked" isocyanate as illustrated by Formulas III and IV or those which result from the reaction of an active hydrogen compound with any of the prepolymers set out in the discussion re Formulas VI and VIII, is admixed with a polyfunctional compound as illustrated in the two package system to form a solution which is stable at room temperature or slightly higher than room temperature. At elevated temperatures, e.g., about 165° C., the blocked isocyanate can be visualized as "unblocking" itself and "instantaneously" reacting with the polyfunctional compound (preferably the polyhydroxy compounds illustrated supra) to thus form the coating.

In various aspects, the polyisocyanates as well as the "blocked" and "partially blocked" isocyanates illustrated in this specification with/without active hydrogen-containing compounds can be employed to treat textile materials. Such treatment can impart to the treated textile material a host of desirable characteristics among which the following should be noted: (1) water repellency, (2) improve wet strength, (3) reduce shrinkage, (4) improve dye-receptivity, (5) induce flame-proofing, (6) modification of cellulose and cellulosic derivatives (a) to improve water resistance, and (b) to raise softening point, and/or (7) improve resistance.

Two methods can be employed in the treatment of textile material, namely the so-called "emulsion" treatment and the "solution" treatment. In the "emulsion" method, the isocyanate-containing compound, an emulsifier, and water are mixed to form an emulsion. The textile material to be treated is immersed in this emulsion, excess emulsion is then squeezed out, and the treated textile material cured at elevated temperatures. In the "solution" method the textile material is immersed in a solution of the isocyanate containing compound in an inert normally liquid organic vehicle, e.g., toluene, followed by air drying and curing at elevated temperatures, e.g., about 100° to 150° C. If it is desired to use an active hydrogen compound, the textile material is usually impregnated with said compound prior to immersion in the isocyanate-containing bath. In the case of monomeric isocyanates such as those exemplified by Formula I supra, the "solution" method is preferred.

Flame proofing of the textile material can be induced through the use of the polyisocyanates illustrated in this specification and hydroxyl-containing phosphorus compounds and/or halogen-containing active hydrogen compounds.

Improvement of abrasion resistance can be accomplished by the use of the afore-illustrated "blocked" and/or "partially blocked" isocyanates. The textile material to be treated is dipped into an inert solution containing the "blocked" or "partially blocked" isocyanate which can be maintained, for example, at temperatures in excess of unblocking temperature. The unblocked isocyanate then reacts with active hydrogen-containing material within the textile material, or else an active hydrogen-containing material can be included in the solution and the unblocked isocyanate reacts with it to form a coating on or in the textile material. Of course, the polyisocyanates with/without an active hydrogen compound contained in an inert normally-liquid organic vehicle can be employed in this respect.

It is pointed out that the term "textile" or "textile material," as used herein, includes by way of illustrations, fabric, yarn, filament, cloth, etc.

The starting materials for the production of the carbonate diisocyanates of Formula I supra are the corresponding carbonate diamines or carbonate diamine salts. The carbonate diamines can be conveniently represented by the following general formula:

(IX) 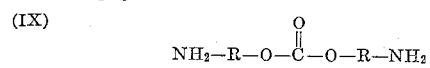

wherein R represents a member selected from the group consisting of divalent substituted and unsubstituted aliphatic, aromatic, alicyclic and heterocyclic groups. Preferred compounds are those wherein R represents a divalent radical containing from 2 to 12 carbon atoms. Particularly preferred compounds represented by the aforesaid formula are those wherein R represents a member selected from the group consisting of alkylene, alkenylene, alkynylene, arylene, cycloalkylene, cycloalkenylene, alkylcycloalkylene, and heterocyclylene.

Illustrative compounds encompassed within the scope of Formula IX supra include bis(2-aminoethyl) carbonate, bis(2-amino-1-methylethyl) carbonate, bis(3-amino-n-propyl) carbonate, bis(4-aminobutyl) carbonate, bis(7-aminoheptyl) carbonate, bis(8-aminooctyl) carbonate, bis(10-aminodecyl) carbonate, bis(2-methyl-3-aminopropyl) carbonate, bis(2,2-dimethyl-3-aminopropyl) carbonate, 2-aminoethyl 3-aminopropyl carbonate, 3-aminopropyl 8-aminooctyl carbonate, 2-methyl-3-aminopropyl 2-aminoethyl carbonate, bis(4-amino-2-butenyl) carbonate, bis(5-amino-3-pentenyl) carbonate, bis(2-phenyl-3-aminopropyl) carbonate, bis(3-naphthyl-5-aminopentyl) carbonate, bis(3-styryl-5-aminopentyl) carbonate, bis(6-cumenyl-7-aminoheptyl) carbonate, bis(3-aminocyclopentyl) carbonate, bis(4-aminocyclohexyl) carbonate, bis(5-aminocycloheptyl) carbonate, bis(4-aminophenyl) carbonate, bis(2-aminophenyl) carbonate, bis(3-aminophenyl) carbonate, bis(7-amino-2-napthyl) carbonate, bis-(4-amino-3-furyl) carbonate, bis(6-amino-2-benzofuryl) carbonate, bis(7-amino-2-benzopyranyl) carbonate, bis(5-amino-2H-pyran-3-yl) carbonate, the salts of the afore-illustrated compounds (such as the HCl salts thereof), and the like.

The carbonate diamines and salts thereof can be produced in relatively high yields by the reaction of a hydroxy amine salt, contained in an inert, normally liquid reaction medium with a carbonyl dihalide at a temperature which does not exceed the temperature at which the salt dissociates, and thereafter recovering the carbonate diamine dihydrohalide product. It is necessary that the amino group of the hydroxy amine be eliminated as a reaction site in order to obtain exclusive reaction of the hydroxyl groups with phosgene and the intermediate chloroformate. Secondly, it is necessary that the amino groups of the carbonate diamines formed also be neutralized to minimize the possibility of rearrangement which is known to occur with free aminoalkyl esters but not with the corresponding salts of the aminoalkyl esters. Lastly, the particular products obtained from the reaction of salts of the hydroxy amine and phosgene are critically dependent upon the reaction temperature employed.

In practice, it has been found that the amino groups of the hydroxy amine starting compounds, as well as the resulting carbonate diamine, can be successfully shielded as a reaction site by the formation of the hydroxy amine salt prior to the phosgenation reaction. The salt, preferably the hydrochloride, can be formed and subsequently isolated prior to use, or employed directly without isolation. In the latter instance, solvents should be used which will remain inert during the phosgenation step. When the hydroxy amine salt is not to be isolated, it is usually necessary to conduct the neutralization in the solvent with gaseous hydrogen chloride at elevated temperatures in order to obtain a salt of satisfactory purity. When the hydroxy amine salt is to be isolated, it is preferred to effect neutralization in a solvent in which the amine is soluble, such as, for example, chloroform, dimethyl ether of ethylene glycol, tetrahydrofuran or dioxane. In such circumstances, neutralization can be satisfactorily conducted at room temperature.

The products obtained from the phosgenation reaction were found to be critically dependent on the reaction temperature employed. At temperatures above 95° C., either at atmospheric or superatmospheric pressures, 2-chloroethylamine hydrochloride and 1- or 2-chloroethylisocyanate were the sole products isolated when monoethanolamine hydrochloride was treated with phosgene. These chlorinated products presumably were formed by an intramolecular reaction of the intermediate 2-aminoethyl chloroformate hydrochloride or by the direct action of by-product hydrogen chloride on the starting material.

Within the temperature range of from about 65° C. to about 95° C., the carbonate diamine dihydrochloride was the major product formed in yields as high as 95 percent. At a reaction temperature below 65° C., substantially all the starting material was recovered. The preferred operating temperature was from about 70°–75° C. wherein optimum yield of the carbonate diamine dihydrohalide was recovered.

In general, the temperature necessary to produce the carbonate diamine dihydrohalides will be dependent upon both the melting point and the basicity of the particular hydroxy amine starting material. In actual practice, it has been found that the optimum yield will be obtained at a temperature which does not exceed the temperature at which the particular hydroxy amine hydrohalide would dissociate to the free amine under the conditions employed. Thus, while the phosgenation reaction is critically dependent upon the reaction temperature, the actual temperature employed will not necessarily be the same for each starting material. As a general rule, however, the temperature will usually fall within the range of from about 35° to about 150° C. Pressure is not necessarily critical and the process can be conducted at atmospheric, subatmospheric or superatmospheric pressures.

In general, the liquid reaction medium employed in the conversion of the amine salt to the corresponding carbonate diamine dihydrohalide must be inert to the reactants and stable under the conditions employed. Moreover, it should be easily separable from the resulting carbonate diamine dihydrohalide. Typical inert, liquid vehicles which have been found suitable include, among others, aromatic hydrocarbons such as toluene, tetrahydronaphthalene, benzene; cycloaliphatic hydrocarbons such as cyclohexane, decahydronaphthalene; the chlorinated aromatic hydrocarbons such as chlorobenzene; the chlorinated aliphatic hydrocarbons such as carbon tetrachloride, tetrachloroethylene, trichloroethylene. Reaction media in which either the hydroxy amine salt or the carbonate diamine dihydrohalide, was soluble were found to be unsatisfactory.

In general, the conversion of the carbonate diamine or carbonate diamine salt to the carbonate diisocyanate is accomplished by sparging a carbonyl dihalide, preferably phosgene, through a slurry of the carbonate diamine or carbonate diamine dihydrohalide contained in an inert, normally liquid reaction medium at a temperature within the range of from 100° to 225° C., and thereafter recovering the carbonate diisocyanate. In either instance, it is believed that the intermediate carbamoyl chloride is first formed from the free amine and subsequently thermally degraded to the diisocyanate at the reaction temperature employed. In general, the liquid reaction medium employed in the conversion of the carbonate diamine or carbonate amine salt to the corresponding carbonate diisocyanates must be inert to the reactants and stable under the conditions employed. Moreover, it should be easily separable from the resulting carbonate diisocyanate. Typical inert, liquid vehicles which have been found suitable have been illustrated above.

The optimum temperature for the conversion of the carbonate diamine to the carbonate diisocyanate is influenced, to a degree, by various reaction variables. For instance, in a batch type reactor with ortho-dichlorobenzene as the inert reaction medium, an amine hydrohalide concentration of 20 to 25 weight percent, based on the weight of the medium, and a phosgene feed rate of 0.5 to 1.0 mole per mole of amine hydrohalide per hour, the optimum temperature range is from 125° C. to 170° C. Pressure is not a critical feature.

Various terms, abbreviations, designations, properties, etc., used in this specification are explained hereinbelow:

MOCA represents 4,4'-methylene-bis(2-chloroaniline).
$BF_3$-MEA represents boron trifluoride-monoethanolamine complex.
TDI represents an 80/20 mixture (by weight) of 2,4- and 2,6-tolylenediisocyanate.
DMF represents N,N-dimethyl formamide.
EDA represents ethylenediamine.
Shore D hardness, Shore A-2 hardness—Determined according to ASTM D1706–59T. Instruments were Shore Durometers D and A-2.
Impact resistance was determined by the Gardner bump test method.

The Gardner Bump Tester consists of a weight which can be dropped onto a plunger from a measured height. The plunger rests on the material to be tested—the test sample being placed over a circular opening.

Samples were tested at about 26° C. and were generally ¼" in thickness. The test was repeated, at a different point on the sample each time, until the sample either cracked, broke into pieces, or the limits of the weights were attained.

Impact resistance was calculated by multiplying the weight by the distance dropped and recorded in "inch pounds."

Stiffness modulus—A secant modulus measure determined in the following manner. A sample in an Instron at 26° C. is extended to one percent of its original length at 0.1 inch/min. for 1 inch gauge length. The stress in p.s.i. necessary to extend the sample one percent is determined and the Stiffness Modulus determined by dividing this stress in p.s.i. by 0.01, to wit:

$$\frac{\text{P.s.i. at } 1\% \text{ extension}}{0.01} = \text{Stiffness Modulus, p.s.i.}$$

Sward hardness—The hardness measured by the number of oscillations of a Sward hardness rocker on a specified substrate coated with the material to be tested.

The sole figure represents stress-strain curves which were obtained in the following manner:

(a) ASTM D 412 62t die C tensile dog bones, bench marked for one inch gauge lengths, were extended at an Instron crosshead rate of 20 inches per minute to a strain of 300 percent (as measured by the relative displacement of the bench marks); the loading portion of the loading-unloading cycle is indicated by line o–a in the figure.

(b) The samples were held at 300 percent elongation for 1 minute, during this time stress due to extension "decays" as bonds between molecules breakdown and the molecular chains orient themselves in the direction of extension, this phenomenon is indicated by the line a–b.

(c) The crosshead of the tensile tester was returned to its original position at a rate of 20 inches per minute, note that the stress response of the samples to extension becomes zero before the specimen returns to the state of zero elongation (line b–c).

(d) After allowing one minute for the samples to "recover" they were strained at a rate of 20 inches per minute to rupture (line e–f). This measures tensile strength.

"Stress decay" is defined as the absolute decrease in stress ($\Delta \sigma$) divided by the original stress at point (a). This ratio is most often expressed as a percentage. Stress decay and creep, extension of a sample with time when subjected to a constant load, are functionally related. A material exhibiting a large amount of stress decay will also exhibit a large amount of creep. A girdle made from a yarn exhibiting a large amount of creep would expand with time upon wearing and provide less and less support as the period of wearing increased.

The areas encompassed by the points oad and cbd are proportional, respectively, to the work done on the sample when extending it and the work given back by the sample when it is released. The ratio of the work returned by the sample to the work done on the sample is defined as "work recovery." This parameter is a measure of how "snappy" the material is. High work recovery values are associated with materials of high snap.

"Tension set" is the amount of permanent increase in length due to holding a specimen at an elongation of 400 percent for 16 hours at 21° C. The strain level (400%) and the amount of permanent increase in length are determined by the relative displacement of gauge marks initially placed 1 inch apart. Tension set is measured 10 minutes after the strained sample is released.

CDI represents bis(2-isocyanatoethyl) carbonate.

Fadeometer test—Light source is a violet carbon arc lamp which produces a spectrum from 270 m$\mu$ through 2000 m$\mu$. Sample is rotated in the presence of said light source at 63° C. and 35 percent relative humidity. Exposed sample is compared with unexposed sample.

Standard amine analysis for isocyanate—The isocyanato-containing compound to be analyzed is weighed into a measured amount (excess) of di-n-butylamine solution in dry toluene (in solution), and allowed to stand for 30 minutes at about 26° C. with occasional swirling. Isopropanol then is added and the excess amine is titrated with standard HCl to the bromophenol blue end point.

Hydroxyl number—The minimum number of milligrams of KOH that is required to neutralize the acid which is generated by the reaction of one gram of the hydroxyl-containing compound with anhydride, e.g., acetic anhydride, or its halide. The following equation illustrates the foregoing:

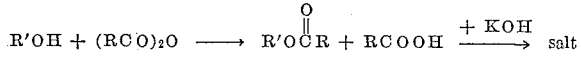

The hydroxyl number is also determined by the following equation:

$$OH = \frac{56.1 \times 1000 \times F}{M.W.}$$

wherein OH is the hydroxyl number, wherein F is the functionality, i.e., number of hydroxyl groups, of the hydroxyl-containing compound, and wherein M.W. is the molecular weight of the hydroxyl-containing compound.

*Example I.—Bis(2-aminoethyl)carbonate and dihydrochloride salt*

A mixture of 61 grams of 2-aminoethyl alcohol (1.0 mole) and 300 milliliters of 1,3,4-trichlorobenzene was saturated with gaseous hydrogen chloride at 69–78° C. Ethyl chloroformate was then added over a period of about fifteen minutes. The reaction temperature was then maintained at about 100° C. for seven hours and subsequently the reaction mixture was treated with an excess of gaseous phosgene at about 100° C. for 7.5 hours. The resulting while solid was separated from the reaction medium by filtration, washed with ethyl ether, and dried under vacuum at ambient temperature. The dried material, 22 grams, represented a 19.9 percent yield, was water-soluble and had a melting point of 204.5° C. Upon analysis the compound had the following properties: Calculated for $C_5H_{14}Cl_2N_2O_3$: C, 27.15; H, 6.33; N, 12.66. Found: C, 26.90; H, 6.20; N, 12.75. Infrared spectrum was in agreement with that of the assigned structure with absorption maxima at 3.75$\mu$, 3.85$\mu$, 4.05$\mu$ (amine hydrochloride); 5.70$\mu$ (carbonate C=O); 8.0$\mu$ (carbonate C—O); 10.45$\mu$, 12.95$\mu$ (open chain carbonate).

Upon basefication of the bis(2-aminoethyl) carbonate dihydrochloride, the free carbonate diamine is obtained.

Example 2.—Bis(2-isocyanatoethyl) carbonate

A slurry of 15 grams of bis(2-aminoethyl) carbonate dihydrochloride, (.068 mol) in 200 milliliters of toluene was maintained at reflux temperature while gaseous phosgene was sparged through the mixture for approximately six hours. 1,2,4-trichlorobenzene was then added to the reaction mixture and the phosgenation was continued for twelve hours with the reaction temperature being maintained at 125–130° C. After cooling, the mixture was filtered and 8.0 grams of unreacted bis(2-aminoethyl) carbonate dihydrochloride was recovered. The organic vehicles were removed by distillation yielding 12.0 grams of a residue product which represented a yield of 88.5 percent of the theoretical value. Distillation of the residue furnished a refined product with a boiling point of about 120° C. at a pressure of 0.1 millimeter of mercury and a refractive index, $n$ 30/$D$, of 1.4600. Upon analysis the product had the following properties: Calculated for $C_7H_8N_2O_5$: C, 42.00; H, 4.00; N, 14.00. Found: C, 42.16; H, 4.97; N, 14.32. Infrared spectrum was in agreement with that of the assigned structure with absorption maxima at 4.42$\mu$ (isocyanate —NCO); 5.74$\mu$ (carbonate C=O); 7.94$\mu$ (carbonate C—O).

A sample of the refined product was converted into a solid bisurea derivative by reaction with aniline. The derivative had a melting point of 163–165° C. and the following properties: Calculated for $C_{19}H_{22}N_4O_5$: C, 59.2; H, 5.71; N, 14.5. Found: C, 58.72; H, 5.61; N, 14.39. Infrared spectrum was in agreement with that of the assigned structure with absorption maxima at 3.02$\mu$ (urea NH); 5.75$\mu$ (carbonate C=O); 6.07$\mu$ (secondary amide C=O); 6.28$\mu$, 6.68$\mu$ (aromatic C=C); 6.45$\mu$ (secondary amide NH); 8.15$\mu$ (carbonate C—O); 13.25$\mu$, 14.55$\mu$ (monosubstituted aromatic ring).

Example 3.—Bis(4-nitrophenyl) carbonate

A solution containing 417 grams of p-nitrophenol (3.0 mols) in 900 milliliters of benzene was treated with a 20 percent by weight aqueous solution of sodium hydroxide (120 grams, 3.0 mols) with the temperature being maintained at 50° C. Gaseous phosgene was subsequently sparged into the mixture for 2.5 hours at the rate of one mole per hour. The resulting mixture was filtered, the layers separated and the benzene removed from the oil layer by distillation leaving a solid residue. The composited solid from the filtration and oil layer was recrystallized from benzene yielding 432 grams of semi-refined product with a melting point of 140°–143° C. The product represented a yield of 94.8 percent of the theoretical value. A sample of this material was recrystallized from an ethylene dichloride-isopropanol mixture for analytical purposes. The following analysis was obtained: Calculated for $C_{13}H_8N_2O_7$: C, 51.3; H, 2.63; N, 9.22. Found: C, 51.2; H, 2.86; N, 8.84. Infrared spectrum was in agreement with that of the assigned structure with maxima at 5.68$\mu$ (carbonate C=O); 6.54$\mu$ and 7.4$\mu$ (—NO$_2$); and 8.0$\mu$ (carbonate C—O).

Example 4.—Bis(4-aminophenyl) carbonate dihydrochloride

A solution containing 75 grams of bis(4-nitrophenyl) carbonate (0.25 mol) in 100 milliliters of ethyl acetate was hydrogenated in the presence of 50 grams of Raney nickel with a maximum hydrogen pressure of 300 pounds per square inch at ambient temperatures (15°–20° C.). After the catalyst had been removed, anhydrous hydrogen chloride was sparged into the clear solution. The product which was isolated by filtration, yielded 125 grams which represented 80.2 percent of the theoretical value and had a decomposition point of 184° C. The following analysis was obtained: Calculated for $C_{13}H_{14}Cl_2N_2O_3$: C, 49.2; H, 4.42; N, 8.83. Found: C, 49.16; H, 4.54; N, 8.70. Infrared bands of functional groups were consistent with those of the assigned structure with maxima at 3.4$\mu$ and 3.85$\mu$ (NH$_4^+$); 5.60$\mu$ (carbonate C=O); 6.25$\mu$ and 6.65$\mu$ (aromatic C=C); 7.85$\mu$ (carbonate C—O); and 12.1$\mu$ (para-disubstituted aromatic ring).

Example 5.—Bis(4-isocyanatophenyl)carbonate

An ethyl acetate solution of bis(4-aminophenyl)carbonate, which was prepared in accordance with the procedure described in Example 4 was added to 2000 milliliters of a liquid surface at a rate of 271 cubic centimeters per minute. The phosgene addition was terminated after 21 hours and nitrogen was then sparged through the mixture to remove unreacted phosgene and by-product hydrogen chloride. After cooling to room temperature, the mixture was filtered and the solvent was removed under vacuum. The crude residue product was then passed through a falling film-type evaporative still at 122.5° C. under a pressure of from 0.14 to 0.19 milliliter of mercury. The recovered product, 99 grams, represented a yield of 60 percent of the theoretical and had a refractive index, $n$ 30/$D$, of 1.4623. Upon analysis the product had the following properties: Calculated for $C_7H_8N_2O_5$: C, 42.00; H, 4.00; N, 14.00. Found: C, 41.45; H, 3.92; N, 13.43. Infrared spectrum is in agreement with that of the assigned structure.

Example 6.—Bis[2-(3-allylureido)ethyl] carbonate

To 177 grams of allylamine in 700 milliliters of anhydrous toluene, there was added 301 grams of bis(2-isocyanoethyl) carbonate (1.5 mols) over a period of 3 hours at 25° to 35° C. The crystalline material obtained as product was filtered and recrystallized from isopropanol to give 427 grams of product which was 91 percent of the theoretical yield. The product melted at 140–141° C.

*Analysis.*—Calculated for $C_{13}H_{22}N_4O_5$: C, 49.70; H, 7.05; N, 17.80. Found: C, 49.47; H, 7.00; N, 17.44.

Example 7.—Bis[2-(allyloxyformamido)ethyl] carbonate

To 180 grams of allyl alcohol (3.1 moles) containing 1 gram of triethylamine as catalyst, there was added 301 grams of bis(isocyanatoethyl) carbonate (1.5 mols) over a period of 40 minutes at 40° C. The reaction mixture was maintained at 40° C. for an additional hour whereupon the product was filtered and recrystallized from ethyl ether to give 351 grams of product melting at 43.5° to 44.5° C. which was 74 percent of the theoretical yield.

*Analysis.*—Calculated for $C_{13}H_{20}N_2O_7$: C, 49.38; H, 6.37; N, 8.85. Found: C, 49.35; H, 6.35; N, 8.78.

Example 8.—Bis[2'-(2-methyl-1,2,3,6-tetrahydrobenzyloxyformamido)ethyl] carbonate To 284 grams of 2-methyl-1,2,3,6-tetrahydrobenzyl alcohol containing three drops of di-n-butyltin diacetate as catalyst was added 200 grams of bis(2-isocyanatoethyl) carbonate over a period of 1 hour. The temperature was maintained at 45° C. during the addition, then raised to 60° C. and held for an additional 90 minutes. The residue was stripped of low boiling material and recrystallized from benzene and cyclo hexane to give 319 grams of a product melting at 78°–80.5° C. which was 70.6 percent of the theoretical yield.

*Analysis.*—Calculated for $C_{23}H_{36}N_2O_7$: C, 61.05; H, 8.02; N, 6.19. Found: C, 61.20; H, 8.17; N, 6.16.

Example 9.—Bis[2'-(2-cyclopentenyloxyformamido)ethyl] carbonate

To 261 grams of 2-cyclopentenol (3.1 mols) containing 1 gram of triethylamine as catalyst, was added 300 grams of bis(2-isocyanatoethyl) carbonate over a period of one hour. The temperature was maintained at 25 to 36° C. during the addition then was raised to 45° C. and held for an additional 2 hours. The residue was treated with activated charcoal and recrystallized from benzene and hexane to give 323 grams of a product melting at 109 to 110.5° which was 58% of the theoretical yield.

*Analysis.*—Calculated for $C_{17}H_{24}N_2O_7$: C, 55.40; H, 6.56; N, 7.61. Found: C, 55.62; H, 6.62; N, 7.72.

*Example 10.—Bis[2-(tricyclo[5.2.1.0²,⁶]dec-4-en-8-yloxyformamido)ethyl] carbonate*

To 315 grams of dicyclopentadiene hydrate (2.1 moles) and 1 gram of triethylamine in 100 milliliters of anhydrous toluene was added 200 grams of bis(2-isocyanatoethyl) carbonate (1 mol) at a temperature of 45 to 60° C. over a period of 5 hours. The isolated residue product exhibited the amorphous characteristic of a low melting glass.

*Analysis.*—Calculated for $C_{27}H_{36}O_7$: C, 64.85; H, 7.25; N, 5.59. Found: C, 64.01; H, 7.43; N, 5.36.

*Example 11.—Bis[2'-(2-propynyloxyformamido)ethyl] carbonate*

To 62.9 grams of propargyl alcohol (1.1 mols) and 3 drops of triethylamine in 100 milliliters of anhydrous benzene there was added 100 grams of bis(2-isocyanatoethyl) carbonate (0.5 mol) over a period of one hour at a temperature of 25° C. The temperature was raised to 55° C. and held for 3 hours. The residue was stripped of low boiling material to give 104 grams of a product melting at 50° C. which was 66.7 percent of the theoretical yield.

*Analysis.*—Calculated for $C_{13}H_{16}N_2O_7$: C, 50.0; H, 5.16; N, 8.94. Found: C, 50.23; H, 5.39; N, 8.85.

*Example 12.—Bis[2-(n-butylmercaptoformamido)ethyl] carbonate*

To 77 grams of n-butyl mercaptan and 2 drops of triethylamine in 110 milliliters of anhydrous toluene there was added 75.4 grams of bis(2-isocyanatoethyl) carbonate (0.377 mol) over a period of one hour at a temperature of from 25 to 40° C. The mixture was held for an additional 5 hours at 40 to 50° C. The residue was stripped of low boiling material and was treated with acid and water until neutral. There was obtained 117 grams of a product which melted at 67 to 69° C. which was 82 percent of the theoretical yield.

*Analysis.*—Calculated for $C_{15}H_{28}N_2O_5S$: C, 47.7; H, 7.42; N, 7.37; S, 16.85. Found: C, 47.8; H, 7.64; N, 7.63; S, 16.13.

*Example 13.—Bis[2'-(2-cyanoethoxyformamido)ethyl] carbonate*

To 78.2 grams of ethylene cyanohydrin (1.1 mols) containing a drop of di-n-butyltin diacetate was added 100 grams of bis(2-isocyanatoethyl) carbonate (0.5 mole) over a 30 minute period at a temperature of 25 to 50° C. The temperature was maintained at 50° C. for an additional 30 minutes and at 80° C. for 90 minutes. The residue was recrystallized from ethylene dichloride and hexane to give a product melting at 87.5 to 89° C. which was 91 percent of the theoretical yield.

*Analysis.*—Calculated for $C_{13}H_{18}N_4O_7$: C, 45.6; H, 5.3; N, 16.36. Found: C, 45.59; H, 5.78; N, 16.27.

*Example 14.—Bis[2-(methallyloxyformamido)ethyl] carbonate*

To 151 grams of methallyl alcohol (2.1 mols) and 0.5 gram of triethylamine was added 200 grams of bis(2-isocyanoethyl)carbonate (1.0 mol) over a 30 minute period at a temperature of 40° C. After 5 hours the mixture was stripped of low boiling material under reduced pressure and recrystallized from ethyl ether to give 300 grams of a product melting at 50.2 to 51.2° C. which was 87 percent of the theoretical yield.

*Analysis.*—Calculated for $C_{15}H_{27}O_7N_2$: C, 52.32; H, 7.02; N, 8.13. Found: C, 52.48; H, 7.46; N, 8.23.

*Example 15.—Bis[2'-(2-chloroethoxyformamido)ethyl] carbonate*

To 177 grams of ethylene chlorohydrin (2.2 mols) containing 2 drops of triethylamine was added 200 grams of bis(2-isocyanatoethyl) carbonate (1.0 mol). The reaction mixture was stirred at 50 to 60° C. for 6 hours and maintained at 75 to 85° C. for an additional 3 hours. The residue was recrystallized from benzene to give 278 grams of a product melting at 81.5 to 82.5° C. which was 77 percent of the theoretical yield.

*Analysis.*—Calculated for $C_{11}H_{18}O_7N_2Cl_2$: C, 36.58; H, 5.02; N, 7.75; Cl, 19.63. Found: C, 36.58; H, 5.05; N, 7.71; Cl, 19.75.

*Example 16.—Bis[2-(3,3-diallylureido)ethyl] carbonate*

To 216 grams of diallylamine (2.2 mols) in 500 milliliters of benzene was added 200 grams of bis(2-isocyanoethyl) carbonate (1.0 mol) over a 2 hour period at 35° C. After an additional hour at 55° C. the residue was stripped and recrystallized to give a product which melted at 79.5° to 81° C.

*Analysis.*—Calculated for $C_{19}H_{30}N_4O_5$: C, 57.86; H, 7.67; N, 14.27. Found: C, 58.04; H, 7.95; N, 14.00.

*Example 17.—Bis[2-(3butylureido)ethyl] carbonate*

To 102 grams of n-butylamine in 500 milliliters of benzene was added 100 grams of bis(2-isocyanatoethyl) carbonate (0.5 mol) at a temperature of 40° C. After 2 additional hours at 40° C. the residue was stripped and recrystallized from ethanol to give 124 grams of a product melting at 123.5 to 124.5° C. which was 71.5 percent of the theoretical yield.

*Analysis.*—Calculated for $C_{15}H_{30}N_4O_5$: C, 52.0; H, 8.73; N, 16.18. Found: C, 52.22; H, 9.03; N, 16.45.

*Example 18.—Bis[2-(6-aminohexylureido)ethyl] carbonate*

To 11.6 grams of 1,6-hexanediamine (0.10 mol) in 40 grams of dry benzene there was added 10 grams of bis(2-isocyanatoethyl) carbonate (0.05 mol) at a temperature of 35° C. The solid material which formed was filtered, washed with anhydrous ether and dried. The melting point was 163° C. The infrared analysis of the solid product obtained was consistent with the proposed structure with maxima at 5.73μ, carbonate C=O; 8.0μ, carbonate; 2.98μ, NH plus $NH_2$; 6.13μ, urea C=O plus $NH_2$.

*Example 19.—Bis[2-(2-hydroxyethioxyformamido)-ethyl] carbonate*

To 15.6 grams of 2-mercaptoethanol (0.2 mol), there was added 20 grams of bis(2-isocyanatoethyl) carbonate (0.1 mol). The reaction temperature rose to 65° C. and stirring was continued until the reaction had subsided. The infrared analysis of the clear liquid product was consistent with the proposed structure with maxima at 6.52μ, carbamate NH; 5.78μ, carbonate C=O; 12.7μ, carbonate; 3.03μ, NH and OH 6.08μ, thiol-carbamate C=O (strong); 9.43μ, C—OH.

*Example 20*

To 22 grams of the propylene oxide adduct of sorbitol having a hydroxyl number of about 500 (0.2 equivalent) and 2 drops of di-n-butyltin diacetate there was added 10 grams of bis(2-isocyanatoethyl) carbonate (0.1 equivalent). The reaction temperature rose to 90° C. and stirring was continued until the reaction had subsided. The infrared analysis of the rubbery-like product was consistent with the proposed structure with maxima at 6.53μ, carbamate NH; 5.78μ, carbonate C=O; 12.7μ, carbonate; 2.96μ, OH; 9.8μ, C—OH.

*Example 21.—Bis[2-(p-carboxyphenylureido)ethyl] carbonate*

To 13.7 grams of p-aminobenzoic acid (0.1 mol) in 40 grams of dry acetone there was added 10 grams of bis-(2-isocyanatoethyl) carbonate (0.05 mol) at a temperature of 40° C. The reaction temperature was maintained at 40° C. for an additional hour. The infrared analysis of the solid crystalline product which had a melting point of 200° C. was consistent with the proposed structure with maxima at 5.73μ, carbonate C=O; 12.7μ, carbonate;

2.96μ, NH; 3.73 and 3.91μ, acid OH; 5.95μ, acid C=O, 6.26μ, aromatic C=C; 7.95μ, carbonate C—O; 10.8μ, acid C—OH, 11.7μ, 1,4 substituted aromatic.

*Analysis.*—Calculated for $C_{21}H_{22}N_4O_9$: N, 11.81. Found: N, 11.43.

*Example 22.—Bis[2-(4-hydroxy-2-buteneoxyformamido)-ethyl] carbonate*

To 2-butene-1,4-diol containing 2 drops of di-n-butyltin diacetate was added 20 grams of bis(2-isocyanatoethyl) carbonate (0.1 mol). The reaction temperature rose to 140° C. and stirring was continued until the reaction had subsided. The infrared analysis of the viscous product was consistent with the proposed structure with maxima at 6.52μ, carbamate NH; 5.8μ, carbonate C=O; 12.7μ, carbonate; 3.0μ, NH and OH; 5.83μ, carbamate C=O; 9.75μ, C—OH.

*Analysis.*—Calculated for $C_{15}H_{12}N_2O_9$: N, 7.44. Found: N, 7.53.

*Example 23.—Bis[2-(1-piperazinoformamido)ethyl] carbonate*

To 17.2 grams of piperazine in 40 grams of dry benzene was added 20 grams of bis(2-isocyanatoethyl) carbonate (0.1 mol) at a temperature of 35° C. The infrared analysis of the white solid product which had a melting point of 70° C. was consistent with the proposed structure with maxima at 5.74μ, carbonate C=O; 12.65μ, carbonate; 2.95μ, NH; 6.15μ, secondary amide C=O; 6.5μ, secondary amide NH, 8.05μ, carbonate C—O.

*Example 24*

A solution of bis(2-isocyanatoethyl) carbonate (15 grams; .075 mol) in ethyl acetate (9.2 grams) was maintained at 60° C. while a mixture of 1,1,1-trimethylolpropane (3.4 grams; .025 mol) and toluene (9.2 grams) was added over a 35 minute period. The 50 percent solids mixture was stirred for 10 minutes, then the temperature was elevated to 75–80° C. and maintained thereat for 5 hours. Analysis of the mixture for isocyanate equivalent gave 267. The calculated isocyanate equivalent is 245.

*Example 25*

A mixture of bis(2-isocyanatoethyl) carbonate (20 grams; 0.1 mol), the propylene oxide adduct of glycerol having a hydroxy number of 406 (13.8 grams; 0.033 mol), and Cellosolve acetate (29.6 grams; 50% solids) was charged to a stirred reaction flask. The temperature was maintained at 75° C. for 5 hours then cooled. The isocyanate equivalent by analysis was 337 (calculated isocyanate equivalent=338). A sample of the material was stripped free of Cellosolve acetate solvent and analyzed by infrared spectrum which was in agreement with that expected for the subject compound with maxima at 2.96μ, NH; 4.37μ, NCO; 5.73μ, C=O of carbonate; 5.84μ, C=O of carbamate; 6.55μ, NH of carbamate; 8.95μ, ether C—O—C; 12.65μ, carbonate.

*Example 26.—2,2'-(ethyleneoxythiodiformamido)-diethyl bis(2-isocyanatoethyl carbonate)*

Bis(2-isocyanatoethyl) carbonate (20 grams; .1 mol) and 2-mercaptoethanol (3.9 grams; 0.05 mol) were mixed and two drops of di-n-butyltin diacetate were added. The temperature rose rapidly to 150° C. and stirring was continued until the reaction had subsided. The white solid product was analyzed by infrared analysis and the spectrum was in agreement with that expected for the desired product with maxima at: 3.0μ, —NH; 4.43μ, NCO; 5.76μ, carbonate C=O; 5.9μ, carbamate C=O; 6.07μ, thiol carbamate C=O; 12.7μ, carbonate.

*Example 27.—2,2-(hexamethylenediureylene)diethyl bis(2-isocyanatoethyl carbonate)*

1,6-hexamethylenediamine (5.8 grams; 0.05 mol) in benzene (60 grams) was fed to a solution of bis(2-isocyanatoethyl) carbonate (20 grams; 0.1 mol) in benzene (140 grams) while the temperature was maintained at 40° C. A white solid was formed immediately. The reaction mixture was stirred for one hour after the addition was completed and was then filtered, washed with anhydrous ethyl ether and dried. The white, powdery, product was obtained in quantative yield and had a melting point of 174° C. Infrared analysis was in agreement with that for the proposed structure with maxima at 2.98μ, NH; 4.38μ, NCO; 5.73μ, carbonate C=O; 6.13μ, urea C=O; 6.4μ; urea NH; 8.0μ, carbonate C—O; and 12.65μ, carbonate.

*Example 28.—2,2-(4-methyl-m-phenylenediureylene) diethyl bis(2-isocyanatoethyl carbonate)*

2,4-tolylenediamine (6.1 grams; 0.05 mol) slurried in benzene (60 grams) was fed slowly to bis(2-isocyanatoethyl) carbonate (20 grams; 0.1 mol) in benzene (160 grams) at a temperature of 30° C. Solids began forming immediately and the mixture was stirred for one hour after the addition was completed. Subsequent filtration, washing with anhydrous ether, and drying gave a tan colored, powdery product which had a melting point of 180° C. Infrared analysis was in agreement with the proposed structure with maxima at 2.98μ, NH; 4.37μ, NCO; 5.72μ, carbonate C=O; 6.05μ, urea C=O; 6.25 and 6.76μ; aromatic C=C; 12.3μ, 1,2,4-trisubstituted aromatic ring; 12.67μ, carbonate.

*Analysis.*—Calculated for $C_{21}H_{26}N_6O_{10}$: N, 16.13. Found: N, 16.18.

*Example 29.—2-(butoxyformamido)ethyl-2-isocyanatoethyl carbonate*

Bis(2-isocyanatoethyl)carbonate (20 grams; 0.1 mol) and n-butyl alcohol were mixed and a drop of di-n-butyltin diacetate was added. The reaction temperature was maintained at about 65° C. by external cooling until the reaction subsided and then allowed to stand for one hour. The resultant product was a water white liquid ($N_D^{30}$1.4584). Infrared analysis was in agreement with the proposed structure with maxima at 2.98μ, NH; 4.37μ, NCO; 5.71μ, carbonate C=O; 5.83μ, carbamate C=O; 12.67μ, carbonates.

*Analysis.*—Calculated for $C_{11}H_{18}N_2O_6$: N, 10.21. Found: N, 10.18.

*Example 30*

Bis(2-isocyanatoethyl) carbonate (20 grams; 0.1 mol) and the propylene oxide adduct of sucrose having a hydroxyl number of 481 (11.65 grams; 0.05 mol) were allowed to react as in Example 29. The temperature rose to 100° C. and a rubbery, solid product was formed. Infrared analysis is in agreement with the proposed structure with maxima at 2.96μ, NH; 4.43μ, NCO; 5.76μ, carbonate C=O; 4.9μ, carbamate C=O; 9.15μ, either C—O—C; 12.7μ, carbonate.

*Example 31*

A mixture of bis(2-isocyanatoethyl) carbonate (10 grams; 0.05 mol), the propylene oxide adduct of 1,2,6-hexanetriol having a hydroxyl number of 252, (11.1 grams; 0.017 mol), and Cellosolve acetate (urethane grade) (21.1 grams; 50% solids) was charged to a stirred reaction flask protected from moisture and heated to 75° C. After a reaction period of 7½ hours at this temperature the isocyanate equivalent by analysis was 405.8. The calculated isocyanate equivalent is 422.5.

*Example 32*

A mixture of bis(2-isocyanatoethyl) carbonate (100 grams; 0.5 mol) and polypropylene glycol having an average molecular weight of 2025 (498 grams; 0.25 mol) was agitated vigorously and maintained at 85° C. for 8 hours. The resulting material was a viscous, easily pourable, colorless liquid. The isocyanate equivalent by analysis was 1218. The calculated isocyanate equivalent is 1212.5.

Example 33

A mixture of bis(2-isocyanatoethyl) carbonate (75 grams; 0.375 mol) and polyethylene glycol having an average molecular weight of 400 (75 grams; 0.187 mol) was agitated vigorously and maintained at 80° C. for 3½ hours. The resulting material was free-flowing, colorless, clear, viscous liquid which had an isocyanate equivalent of 413.5 by analysis. The calculated isocyanate equivalent is 400.

Example 34

A mixture of bis(2-isocyanatoethyl) carbonate (8.0 grams; 0.04 mol) and poly(tetramethyleneoxy) glycol having an average molecular weight of 3000 (50 grams; 0.02 mol) was charged to a stirred flask and agitated vigorously while heating at 75° C. for three hours. The resulting material is a very viscous, straw colored liquid which cools to a light-tan solid (M.P. ° C=37).

Example 35

A prepolymer was prepared by the reaction of CDI (38.8 grams; 0.19 mol) with poly(epsilon-caprolactone) diol (200 grams; .097 mol) at an NCO/OH ratio of two. The reaction was conducted for a period of 3 hours at 75° C. The resulting material was a light brown solid. (The poly(epsilon-caprolactone) diol had an average molecular weight of about 2000 and was prepared via the reaction of epsilon-caprolactone with diethylene glycol as the initiator therefor.)

Examples 36–45

Various carbonate diisocyanate prepolymers were prepared from bis(2-isocyanatoethyl) carbonate and various polyoxyalkylene glycols. The hydroxy/isocyanate ratio was at least two. The reactants were charged to a dry flask, heated to the desired temperature and held at this temperature for 3 hours. The material was analyzed for equivalent weight by the standard amine equivalent method. In those instances where 3 hours was not sufficient, analyses were run at periodic intervals until the equivalent weight reached the theoretical value. In all instances, the prepolymers prepared were non-lachrymatory and showed excellent shelf stability. The results obtained are summarized in Table I.

TABLE I

| Example | Glycol | NCO/OH | Temp., ° C. | Time, hrs. | Equivalent Wt.[1] | | Description |
|---|---|---|---|---|---|---|---|
| | | | | | Theory | Found | |
| 36 | ([2]) | 2/1 | 75 | 3 | 400 | 413.5 | Water white, clear, easily pourable. |
| 37 | ([3]) | 2/1 | 75 | 3 | 500 | 523.0 | Do. |
| 38 | ([4]) | 2/1 | 75 | 4 | 414 | 457 | Light straw, viscous but flows. |
| 39 | ([5]) | 2/1 | 85 | 4 | 712 | 721 | Water white, clear, easily pourable. |
| 40 | ([6]) | 2/1 | 85 | 8 | 1,212.5 | 1,218 | Do. |
| 41 | ([7]) | 2/1 | 75 | 3 | | 1,675 | Tan, waxy solid, M.P. about 50° C. |
| 42 | ([7]) | 2.4/1 | 75 | 3 | | 1,675 | Do. |
| 43 | ([7]) | 3.5/1 | 75 | 3 | | 795 | Brown, thick viscous liquid. |
| 44 | ([7]) | 4.0/1 | 75 | 3 | | 653 | Viscous liquid. |
| 45 | ([7]) | 4.7/1 | 75 | 3 | | 549 | Do. |

[1] Equivalent weight determined by standard amine analysis.
[2] Polyethylene glycol having an average molecular weight of 400.
[3] Polyethylene glycol having an average molecular weight of 600.
[4] Polypropylene glycol having an average molecular weight of 425.
[5] Polypropylene glycol having an average molecular weight of 1,025.
[6] Polypropylene glycol having an average molecular weight of 2,025.
[7] Poly(tetramethyleneoxy) glycol having an average molecular weight of 3,000.

Examples 46–61

Various carbonate diisocyanate prepolymers made from bis(2-isocyanatoethyl) carbonate in a manner similar to that employed in Examples 36–45 were cured with various polyfunctional amines or polyols. In all cases, the prepolymer was prepared from observing an NCO/OH ratio of 2:1.

The prepolymers were weighed into a vacuum flask and degassed under reduced pressure. The curing agent was added in the specified ratio. The amines were added as a melt; the polyols were warmed as necessary to effect solution in the prepolymer. The mixture was agitated and degassed, and cast in dry aluminum dishes coated with Teflon. The dishes were covered loosely and placed in a 75° C. oven for 3 hours after which the castings were removed and permitted to post cure for a week at ambient temperature prior to testing. In some instances uncoated tin molds were employed and traces of tin were removed from the casting with mercury amalgam.

Results are summarized in Table II.

TABLE II

| Ex. | Pre-polymer from— | Curing Agent | NCO/Active H | Curing Temp., °C. | Curing Time, Hrs. | Hardness Shore A-2 | Stiffness Mod., p.s.i. | Tensile, p.s.i. | Elong., percent | 300% Modulus | Description |
|---|---|---|---|---|---|---|---|---|---|---|---|
| 46 | (1) | Amine A 6 | 1.1/1.0 | 75 | 3 | 88 | 5,330 | 1,795 | 570 | 1,189 | Very high gloss. |
| 47 | (2) | ___do___ | 1.3/1.0 | 75 | 3 | 91 | 9,330 | 1,940 | 505 | 1,511 | Very high gloss. Slightly flexible. Very tough. |
| 48 | (3) | ___do___ | 1.1/1.0 | 75 | 3 | 84 | 2,259 | 873 | 1,615 | 476 | Good gloss, tough, snappy, elastic. |
| 49 | (3) | ___do___ | 1.3/1.0 | 75 | 3 | | 2,326 | 863 | 1,513 | 403 | Do. |
| 50 | (3) | ___do___ | 1.5/1.0 | 75 | 3 | | 1,772 | 615 | 1,630 | 355 | Do. |
| 51 | (3) | Polyol H 7 | 1.0/1.0 | 75 | 3 | | | | | | Clear, colorless, slightly tacky. |
| 52 | (3) | Polyol I 8 | 1.0/1.0 | 75 | 3 | | | | | | Do. |
| 53 | (3) | Polyol G 9 | 1.0/1.0 | 75 | 3 | | | | | | Clear, colorless, sticky. |
| 54 | (4) | Amine A | 1.1/1.0 | 75 | 3 | 52 | 661 | 218 | 173 | | Tough, snappy, good gloss. |
| 55 | (4) | ___do___ | 1.1/1.0 | 75 | 3 | 50 | 765 | 250 | 400 | 251 | t-Butylperbenzoate added. |
| 56 | (4) | Polyol H | 1.0/1.0 | 75 | 3 | | | | | | Colorless, clear, sticky, but does not adhere to the hand. |
| 57 | (4) | Polyol I | 1.0/1.0 | 75 | 3 | | | | | | Colorless, clear, sticky. |
| 58 | (4) | Polyol G | 1.0/1.0 | 73 | 3 | | | | | | Colorless, clear, very sticky. |
| 59 | (4) | Polyol H | 1.0/1.0 | 75 | 3 | 10 | | | | | t-Butylperbenzoate added. Very elastic, good memory. Adhesive. |
| 60 | (5) | Amine A | 1.3/1.0 | 75 | 3 | 67 | 1,759 | 4,049 | 1,400 | 472 | Tough, snappy, good memory. |
| 61 | (5) | ___do___ | 1.5/1.0 | 75 | 3 | | 6,208 | 3,507 | 1,120 | 700 | Tough, snappy, excellent memory. |

1 Polyethylene glycol having an average molecular weight of 400.
2 Polypropylene glycol having an average molecular weight of 4,5.
3 Polypropylene glycol having an average molecular weight of 1025.
4 Polypropylene glycol having an average molecular weight of 2025.
5 Poly(tetramethyleneoxy) glycol having an average molecular weight of 3000.
6 Amine A represents 4,4'-methylene-bis(2-chloroaniline).
7 A blend of the propylene oxide adduct of the reaction product of acrolein and phenol which has a hydroxyl number of 255, and the propylene oxide adduct of glycerol which has a hydroxyl number of 653. The resulting blend has a hydroxyl number of 380.
8 Polyol I represents the propylene oxide adduct of sorbitol having a hydroxyl number of 509.
9 Polyol G represents the propylene oxide adduct of glycerol having a hydroxyl number of 633.

*Examples 62–72*

Elastomers were prepared in a manner similar to that employed in Examples 46 through 61. The prepolymer in all instances was prepared from bis(2-isocyanatoethyl) carbonate and poly(tetramethyleneoxy) glycol having a molecular weight of 3000 in which the ratio of NCO/OH was maintained at 2:1, or increased as shown in Table III so as to provide excess isocyanate. Results are shown in Table III.

*Examples 73–74*

Carbonate diisocyanate elastomers were prepared by a one step process by charging bis(2-isocyanatoethyl) carbonate and poly(tetramethyleneoxy) glycol having an average molecular weight of 3000 in a ratio as to provide a NCO/OH ratio of slightly greater than 2:1. The resulting solution was degassed under reduced pressure and molten 4,4'-methylene-bis(2-chloroaniline) was stirred into the solution. The mixture was again degassed, and afterwards cast in Teflon coated aluminum dishes covered loosely and placed in a 75° C. oven for 3 to 6 hours. The castings were removed from the molds and permitted to post cure for one week at room temperature prior to testing.

Results are summarized in Table IV.

TABLE III

| Ex. | Prepolymer NCO/OH | Pre-polymer Eq. Wgt. | Curing Agent 1 | NCO/Active H | Temp., °C. | Time, Hrs. | Hardness Shore A-2 | Stiff. Mod., p.s.i. | Tensile, p.s.i. | Elong., percent | 300% Mod., p.s.i. | Description |
|---|---|---|---|---|---|---|---|---|---|---|---|---|
| 62 | 2/1 | 1,675 | Amine A 1 | 1.3/1.0 | 75 | 3 | 67 | 1,759 | 4,049 | 1,400 | 472 | Tough, snappy, good memory. |
| 63 | 2/1 | 1,675 | ___do___ | 1.5/1.0 | 75 | 3 | | 6,208 | 3,507 | 1,120 | 700 | Tough, snappy, excellent memory. |
| 64 | 2.4/1 | 1,514 | ___do___ | 1.1/1.0 | 75 | 3 | 66 | 1,479 | 2,629 | 1,475 | 387 | High gloss, flexible, rubbery, elastic. |
| 65 | 2.4/1 | 1,514 | ___do___ | 1.0/1.0 | 75 | 3 | 45 | | | | | Soft, rubbery, colored. |
| 66 | 2.4/1 | 1,514 | Polyol I 3 | 1.0/1.0 | 75 | 3 | 44 | | | | | Soft, rubbery, clear. |
| 67 | 2.4/1 | 1,514 | Polyol G 4 | 1.0/1.0 | 75 | 3 | 66 | | | | | Tough, flexible, opaque. |
| 68 | 3.5/1 | 795 | Amine A | 1.1/1.0 | 75 | 3 | 82 | 5,155 | 3,565 | 1,100 | 1,043 | High gloss, flexible. |
| 69 | 3.5/1 | 795 | Amine A 2 Polyol G. | 1.1/1.0 | 75 | 3 | 66 | 1,203 | 1,355 | 753 | 541 | Quite flexible, soft, elastic. |
| 70 | 4.7/1 | 549 | Amine A | 1.1/1.0 | 75 | 3 | 87 | 11,888 | 4,360 | 920 | 1,841 | Good gloss. Very hard and stiff. |
| 71 | 4.7/1 | 549 | ___do___ | 1.3/1.0 | 75 | 3 | 97 | 13,504 | 4,612 | 888 | 1,820 | Good gloss, hard and stiff, but slightly elastic and flexible. |
| 72 | 4.7/1 | 549 | Polyol H 5 | 1.0/1.0 | 75 | 3 | 54 | 469 | 1,069 | 493 | 492 | Soft, flexible, elastic. |

1 4,4'-Methylene-bis(2-chloroaniline).
2 Curing agent is a blend of the polyol and amine.
3 Polyol I represents the propylene oxide adduct of sorbitol having a hydroxyl number of 509.
4 Polyol G represents the propylene oxide adduct of glycerol having a hydroxyl number of 633.
5 A blend of the propylene oxide adduct of the reaction product of acrolein and phenol which has a hydroxyl number of 255, and the propylene oxide adduct of glycerol which has a hydroxyl number of 653. The resulting blend has a hydroxyl number of 380.

TABLE IV

| Ex. | CDI (eq.) | Polyol [2] (eq.) | Amine A [1] (eq.) | NCO/ Active H | Curing Temp., °C. | Curing Time, Hrs. | Hardness Shore A-2 | Stiffness Modulus, p.s.i. | Tensile, p.s.i. | Elong., percent | 300% Modulus, p.s.i. | Description |
|---|---|---|---|---|---|---|---|---|---|---|---|---|
| 73 | .042 | .02 | .02 | 1.1/1.0 | 75 | 3 | 61 | 1,129 | 830 | 1,040 | 434 | Tough, snappy, elastic. |
| 74 | .042 | .02 | .02 | 1.1/1.0 | 75 | 6 | 72 | 1,225 | 2,976 | 1,268 | 551 | Strong, flexible, elastic. A better elastomer than Example 73. |

[1] 4,4'-methylene bis(2-chloroaniline).
[2] Poly(tetramethyleneoxy) glycol having an average molecular weight of 3,000.

*Example 75*

A polyisocyanate prepared as set forth in Example 31 supra was dissolved in a 50:50 mixture (by volume) of tolueneacetone. The resulting solution contained 50 weight percent of said polyisocyanate. A 5.0 mil film of the subject isocyanate was cast on a glass plate and allowed to react with the moisture in the air for about 24 hours at room temperature. The resultant film cured hard and clear.

*Examples 76–80*

In a manner similar to Example 75 supra, several films were prepared. The pertinent data are set forth in Table V infra.

TABLE V

| Example No. | Isocyanate | Solids, Weight Percent [1] | Time, Hrs.[2] | Sward Hardness | Stiffness Modulus, (p.s.i.) | Tensile Strength (p.s.i.) | Elong., percent | Description |
|---|---|---|---|---|---|---|---|---|
| 76 | ([4]) | 50 | 168 | [3] 62 | 264,300 | 11,599 | 5.0 | Very hard. Slightly colored. |
| 77 | ([5]) | 50 | 48 | [3] 58 | 39,160 | 1,992 | 157.0 | Colorless. Clear, very hard. |
| 78 | ([7]) | 50 | 168 | [3] 44 | 182,405 | 4,464 | 190.0 | Sl. colored, Clear. Very hard. |
| 79 | ([6]) | 50 | 114 | [3] 64 | 480,952 | 14,857 | 12.0 | Excellent clarity. Extremely hard surface. |
| 80 | ([8]) | 50 | ([9]) | [3] 1 | | | | Tacky. Clear. |

[1] All films cast as 50 wt. percent isocyanate in Cellosolve acetate.
[2] Cure time at room temperature, i.e., about 23° C.
[3] 15 mil film on glass.
[4] Polyisocyanate prepared in accordance with Example 31 supra.
[5] Polyisocyanate prepared in accordance with Example 25 supra.
[6] Polyisocyanate prepared in accordance with Example 30 supra.
[7] Prepared by reacting 2 equivalents of CDI and 1 equivalent of the propylene oxide adduct of sorbitol having a hydroxyl number of 509 in cellulose acetate (50 wt. percent solids) at 75° C. for 3 hours.
[8] Prepared by reacting 2 equivalents of CDI and 1 equivalent of the propylene oxide adduct of 1, 2, 6-hexanetriol having a hydroxyl number of 240 at 75° C. for 3 hours.
[9] 3 weeks.

*Example 81*

Dipropylene glycol (9.0 grams; 0.134 equivalent) and bis(2-isocyanatoethyl)carbonate (13.4 grams; 0.134 equivalent) were mixed in a vacuum flask and degassed under reduced pressure. About 20 grams of the mixture was poured into a previously cleaned and dried aluminum dish. The dish was covered and placed in a 70° C. oven for 16 hours. The resulting plaque was clear and colorless, with a few bubbles. After standing for 1 week at room temperature the material had a hardness of 80-Shore D and impact strength of 9 inch pounds as measured by the Gardner Bump Tester.

*Examples 82–94*

In a manner similar to Example 81 supra, the following polyurethanes were prepared by the reaction of CDI and polyols using a NCO/OH ratio of one. The pertinent data are set forth in Table VI below.

TABLE VI

| Ex. No. | Polyol System | Cure Time (hrs.) | Cure Temp., °C. | Hardness Shore D | Impact, Inch Pounds | Description of polymer |
|---|---|---|---|---|---|---|
| 82 | ([1]) | 16 | 70 | | | Clear, liquid. |
| 83 | ([2]) | 16 | 70 | | | Do. |
| 84 | ([3]) | 16 | 70 | 70 | 6 | Clear, colorless. |
| 85 | ([4]) | 16 | 70 | 80 | 10 | Clear, sl. yellow. |
| 86 | ([5]) | 16 | 70 | 75 | 12 | Do. |
| 87 | ([6]) | 16 | 70 | 75 | 26 | Clear, colorless. |
| 88 | ([7]) | 16 | 70 | 80 | 8 | Clear, tan color. |
| 89 | ([8]) | 16 | 70 | | 4 | Tan, bubbling. Cured in 2 mins. at room temperature. |
| 90 | ([9]) | 3 | 75 | 86 | 6 | Slightly colored, clear. |
| 91 | ([10]) | 3 | 75 | 87 | 6 | Do. |
| 92 | ([11]) | 3 | 75 | 43 | >480 | Very clear, very slightly flexible. |
| 93 | ([12]) | 3 | 75 | 80 | 100 | Slightly colored, clear. |
| 94 | ([13]) | 3 | 75 | | | Clear, colorless, sticky. |

[1] Polypropylene glycol. Molecular weight=425.
[2] Polypropylene glycol. Molecular weight=1,025.
[3] Hyprose—Hydroxypropyl sucrose (Dow Chem. Co.).
[4] Propylene oxide adduct to triphenylolpropane blended with propylene oxide adduct to glycerine to make OH number of 380.
[5] Propylene oxide adduct to sorbitol to hydroxyl number of 509.
[6] Propylene oxide adduct to glycerine to hydroxyl number of 633.
[7] Propylene oxide adduct to triphenylolpropane to hydroxyl number of 249.
[8] Propylene oxide adduct to triisopropanolamine to hydroxyl number of 707.
[9] Propylene oxide adduct to sucrose to hydroxyl number of 481.
[10] Propylene oxide plus 10 weight percent ethylene oxide adduct to sucrose to hydroxy number of 465.
[11] TP-440—Wyandotte Chem. Co. propylene oxide adduct to trimethylolpropane.
[12] G-2410—Atlas Chem. Co. propylene oxide adduct to sorbitol.
[13] Polyethylene glycol—molecular weight=200.

*Examples 95–113*

A mixture of 6-methyl-3,4-epoxycyclohexylmethyl 6-methyl-3,4-epoxycyclohexanecarboxylate (15.6 grams; 0.1 equivalent), polypropylene glycol of 425 molecular weight (22 grams; 0.1 equivalent), CDI (10 grams; .1 equivalent), and BF$_3$–MEA (0.2 gram) catalyst were degassed under reduced pressure and 20 grams of the mixture was poured into a previously cleaned and dried aluminum dish. The dish was covered loosely and placed in a 75° C. oven for 3 hours. The resultant polymer was clear, colorless, flexible, and very slightly tacky.

oven at 75° C. for 3 hours. The resulting plaque was colorless, transparent, and sticky, but does not adhere to the hand.

*Examples 98–107*

In a manner similar to Example 97 supra, the following products described in Table VII below were obtained.

EXAMPLE VII

| Example No. | Isocyanate | Active H Compound | NCO/Active H | Hardness Shore A-2 | Stiffness Modulus (p.s.i.) | Tensile (p.s.i.) | Elong., percent | Description |
|---|---|---|---|---|---|---|---|---|
| 98 | (¹) | MOCA | 1.3/1.0 | | 2,326 | 863 | 1,513 | Clear, elastic, good memory, strength and gloss. |
| 99 | (¹) | MOCA | 1.5/1.0 | | 1,772 | 615 | 1,630 | Snappy, rubber-like. |
| 100 | (¹) | (⁴) | 1.0/1.0 | | | | | Clear, colorless. |
| 101 | (¹) | (⁵) | 1.0/1.0 | | | | | Sticky, clear, colorless. |
| 102 | (¹) | MOCA | 1.1/1.0 | 84 | 5,330 | 1,795 | 570 | Very high gloss, has a mirror-like surface. Tough, flexible. |
| 103 | (²) | MOCA | 1.3/1.0 | 67 | 1,759 | 4,049 | 1,400 | Tough, snappy, rubber. Flexible, elastic. |
| 104 | (²) | (⁶) | 1.0/1.0 | 45 | | | | Soft, tacky. Colored. |
| 105 | (²) | (⁴) | 1.0/1.0 | 44 | | | | Slightly tacky. |
| 106 | (²) | (⁵) | 1.0/1.0 | 66 | | | | Soft, elastic, tough. |
| 107 | (³) | MOCA | 1.3/1.0 | 75 | | | | Could be cold drawn. Did not return. Hard. Sl. flexible. Opaque. |

¹ Polyisocyanate prepared in accordance with Example 33 supra.
² Polyisocyanate prepared in accordance with Example 34 supra.
³ Polyisocyanate prepared in accordance with Example 35 supra.
⁴ Propylene oxide adduct of sorbitol having a hydroxyl number of 509.
⁵ Propylene oxide adduct of glycerol having a hydroxyl number of 633.
⁶ A blend of the propylene oxide adduct of the reaction product of acrolein and phenol which has a hydroxyl number of 255, and the propylene oxide adduct of glycol which has a hydroxyl number of 380, said blend having a hydroxyl number of 380.

*Example 96*

The polyisocyanate prepared in accordance with Example 32 supra (10 grams; .008 equivalent) and MOCA (1.0 gram; .007 equivalent) (NCO:NH$_2$ ratio=1.1:1.0) were mixed by adding molten MOCA to the isocyanate. The mixture was subsequently degassed and poured into aluminum molds, covered lightly and heated for 3 hours in a 75° C. oven. The resultant polymer is tough, snappy, elastic and has a high gloss. The following properties were determined:

Shore hardness (A-2) _____ 52
Stiffness, modulus, p.s.i. _____ 661
Tensile strength, p.s.i., 1000% _____ 218
Elongation, percent _____ 173

*Example 97*

The polyisocyanate prepared in accordance with Example 32 supra (10 grams; 0.008 equivalent) and a blend of the propylene oxide adduct of the reaction product of acrolein and phenol which has a hydroxyl number of 255, and the propylene oxide adduct of glycerol which has a hydroxyl number of 653, said blend having a hydroxyl number of 380 (1.2 grams; 0.008 equivalent) (NCO/OH=1:1) were mixed well and the mixture degassed under reduced pressure. The degassed material was poured into aluminum molds and cured in a circulating

*Example 108*

CDI (10.0 grams; 0.1 equivalent) and 18.5 grams (0.1 equivalent) of a polyol (prepared by reacting 1.0 equivalent of the propylene oxide adduct of glycerol having a hydroxyl number of 623 with 0.5 equivalent of CDI in neat at 80° C. for 2 hours) were mixed and dissolved gases removed under reduced pressure. The material was poured into a previously cleansed and dried aluminum dish covered loosely, and heated for 4 hours in a 75° oven. The resultant polyurethane is clear, hard and slightly flexible.

*Example 109–113*

In a manner similar to Example 108 supra, the following products described in Table VIII below are prepared.

TABLE VIII

| Example No. | Active Hydrogen Compound | Isocyanate | NCO/OH | Hardness Shore D | Impact, Inch Pounds | Description |
|---|---|---|---|---|---|---|
| 109 | (¹) | Tolylene Diisocyanate (TDI). | 1.0/1.0 | 75 | 25 | Hard. White. |
| 110 | (¹) | CDI (50 Mole Percent) and TDI (50 Mole Percent). | 1.0/1.0 | 79 | 32 | Do. |
| 111 | (²) | CDI | 1/1 | | | Very viscous, clear, colorless, liquid. |
| 112 | (²) | TDI | 1/1 | | | Yellow, soft, tacky. |
| 113 | (²) | TDI (50 Mole Percent), CDI (50 Mole Percent). | 1/1 | | | Very viscous, clear, colorless, liquid. |

¹ Polyol prepared by reacting 1.0 equivalent of the propylene oxide adduct of glycerol having a hydroxyl number of 623 with 0.5 equivalent of CDI in neat at 80° C. for 2 hours.
² Polyol prepared by reacting 0.5 mol of polypropylene glycol having an average molecular weight of 425 and 0.25 mol of CDI in neat at 84° C. for 5.5 hours.

*Example 114.—Bis(2-isocyanatoethyl) carbonate homopolymer*

A. A few drops, approximately 10, of tributylphosphine were mixed into 10 grams of bis(2-isocyanatoethyl) carbonate. In less than 30 seconds the mixture reached a temperature of about 100° C. After cooling to room temperature a clear cross-linked polymeric plaque was obtained. Samples of the homopolymer were evaluated for tensile strength, elongation and stiffness modulus. The results are as follows:

| Sample | 1 | 2 | 3 |
|---|---|---|---|
| Tensile Strength | 11,700 | 11,000 | 11,000 |
| Elongation | 3.5 | 2.9 | 2.8 |
| Stiffness Modulus | 451,000 | 435,400 | 452,400 |

B. In an analogous manner as above, other bis(isocyanatoalkyl) carbonates as well as bis(isocyanatoaryl) carbonates, bis(isocyanatocycloalkyl) carbonates, bis(isocyanatoalkenyl) carbonates, etc., for example, bis(2-isocyanato-1-methylethyl) carbonate, bis(3-isocyanato-n-propyl) carbonate, the bis(isocyanatophenyl) carbonates, the bis(isocyanatocyclohexenyl) carbonates, and other isocyanates encompassed and exemplified within the scope and discussion re Formula I supra, can be homopolymerized to solid polymeric products useful in the potting, casting, laminating, encapsulating, etc., fields. Moreover, solid copolymeric products can be prepared by following the teachings of Example 114 supra by polymerizing a mixture of polyisocyanates comprising at least one of the diisocyanates of Formula I supra with/without various polyisocyanates disclosed in the literature, for example, the polyisocyanates in the publication by Siefken [Annalen, 562, pages 122–135 (1949)].

*Examples 115–117*

CDI and copolycaprolactone (80/20) diol (a hydroxyl terminated diol having an average molecular weight of about 2000 and obtained by reacting 80 parts by weight of epsilon-caprolactone and 20 parts by weight of methyl-epsilon-caprolactone using diethylene glycol as the initiator—designated as "Polycap 80/20" in Table IX infra) were reacted at a NCO/OH of 2.2. The resulting quasi-prepolymer then was extended with a diamine. The poly(urethane/urea) reaction product, in DMF, was cast as a film. The pertinent data re these Spandex-type elastomers are set out in Table IX below.

TABLE IX

| Ex. No. | Preparation and Properties of Quasi-Prepolymers ||||||
|---|---|---|---|---|---|---|
| | Polyol | Eq. Wt.[1] | NCO/OH | Reaction || Quasi ||
| | | | | Time (hrs.) | Temp., °C. | Eq. Wt.[2] | Age (days)[3] |
| 115 | Polycap 80/20 | 1,055 | 2.2 | 1 | 80 | 1,245.7 | 14 |
| 116 | do | 1,055 | 2.2 | 1 | 80 | 1,245.7 | 14 |
| 117 | do | 1,055 | 2.2 | 1 | 80 | 1,245.7 | 14 |

| Ex. No. | Casting and Curing[5] of Elastomers ||| Physical Properties of Film ||||
|---|---|---|---|---|---|---|---|
| | Percent[4] Solids | Amine Extender | NH₂/NCO | Tensile Strength (p.s.i.) | Elong., percent | Work Recovery (percent) | Tension Set (percent) |
| 115 | 15 | EDA[6] | 0.8 | 3,100 | 775 | 37 | |
| 116 | 12 | EDA | 0.7 | 4,680 | 871 | 37.5 | 12 |
| 117 | 12 | MDA[7] | 0.7 | 3,625 | 909 | | |

[1] Eq. wt.—Determined by acetic anhydride-pyridine method for hydroxyl number.
[2] Quasi eq. wt.—Determined by standard amine analysis for isocyanate.
[3] Age—Length of time quasi prepolymer stood prior to extending and casting.
[4] All films were cast as N,N-dimethylformamide solutions.
[5] Curing was accomplished at 80° C. for 16 hours in forced air oven.
[6] EDA—Ethylenediamine.
[7] MDA—4,4'-Methylenedianiline.

*Example 118.—Bis[2'-di(beta-hydroxyethyl)aminoethoxy-2-formamidoethyl] carbonate*

A solution of bis(2-isocyanatoethyl) carbonate (200 grams, 1 mol) in 100 cc. of chloroform was added to a stirred solution of triethanolamine (298 grams, 2 mols) in 100 cc. of chloroform. During the addition, which took 30 minutes, the reaction mixture was maintained at 40°–50° C. The resulting viscous mixture was stirred for an additional 30 minutes at about the same reaction temperature, after which the temperature was lowered to 30° C. The chloroform was removed by vacuum distillation, and a syrupy product was obtained which had the following elemental analysis:

| Element | Found | Calculated |
|---|---|---|
| C | 45.15 | 45.15 |
| H | 7.54 | 7.64 |
| N | 10.89 | 11.24 |

Infrared spectrum was in agreement with that of the assigned structure, with maxima at 3.0 microns (OH); 5.75 microns (carbonate C=O); 5.9 microns (carbamate C=O); 6.5 microns (carbamate NH); 8.0 microns (carbonate and carbamate C—O); and 9.7 microns (OH).

*Example 119.—Bis[N,N'-di(beta-hydroxyethyl)ureylene-2-ethyl] carbonate*

Bis(2-isocyanatoethyl) carbonate (400 grams, 2 mols) was added to a stirred solution of diethanolamine (420 grams, 4 mols) in 750 milliliters to tetrahydrofuran. The addition took 90 minutes, during which time the temperature was maintained at 35° C. The solvent was removed by vacuum distillation, leaving a quantitative yield of viscous product. The product was basic in that it required 2.7 milliliters of 0.1 N HCl to neutralize one gram of alcohol. The basicity indicated that significant quantities of the carbamate derivative, i.e., bis[2'-(beta-hydroxyethyl)aminoethoxy-2-formamidoethyl] carbonate, was produced along with the principal urea derivative product.

Using the same general procedure, but with the isocyanate being added as a 35 weight percent solution in tetrahydrofuran over a period of 4 hours, the same two materials were reacted. The kettle temperature was maintained at a temperature of 0.5° C. during the addition. The product required 1.04 milliliters of 0.1 N HCl per gram to neutralize, which indicated that the polyol product was the urea derivative with little or no carbamate being produced. The polyol had the following elemental analysis:

| Element | Found | Calculated |
|---|---|---|
| C | 44.08 | 43.9 |
| N | 7.77 | 7.33 |
| H | 13.48 | 13.65 |

The infrared spectrum was in agreement with the assigned structure with maxima at 3.03 microns (OH), 5.77 microns (carbonate C=O), 6.5 microns (secondary amide C=O), 6.47 microns (secondary amide NH), 7.95 microns (carbonate C—O), 9.55 microns (alcohol C—OH), and 12.65 microns (aliphatic carbonate).

Illustrative of the amino alcohols which can be employed in Examples 118–119 supra include the alkanolamines, i.e., the monoalkanolamines, the dialkanolamines, the trialkanolamines, and the N-alkyl and N-aryl derivatives thereof, for example, triethanolamine, tripropanolamine, triisopropanolamine, the tributanolamines, the tripentanolamines, the trihexanolamines, the triheptanolamines, the trioctanolamines, the trinonanolamines, the tridecanolamines, mixed trialkanolamines, diethanolamine, diisopropanolamine, dibutanolamine, dihexanolamine, dioctanolamine, didecanolamine, ethanolamine, isopropanolamine, n-butanolamine, hexanolamine, octanolamine, decanolamine, N-phenyldiethanolamine, N-methylmonoethanolamine, N-tolyldiisopropanolamine, N-isopropylmonobutanolamine, N-phenyldiisopropanolamine, and the like. The alkanolamines contemplated are those wherein the alkanol moieties have from 2 to 10 carbon atoms, preferably from 2 to 4 carbon atoms. The N-alkyl or N-aryl substituents preferably have not more than 10 carbon atoms.

Although the invention has been illustrated by the preceding examples, the invention is not to be construed as limited to the materials employed therein, but rather, the invention encompasses the generic area as hereinbefore disclosed. Various modifications and embodiments of this invention can be made without departing from the spirit and scope thereof.

What is claimed is:

1. A process which comprises contacting a compound which contains at least one active hydrogen as determined according to the Zerewitinoff method, with an organic diisocyanate of the formula

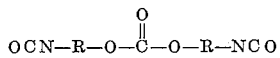

wherein each R represents a divalent group containing from 2 to 12 carbon atoms and which is of the group consisting of substituted and unsubstituted aliphatic, alicyclic, aromatic, and heterocyclic groups, and wherein each isocyanato moiety is at least two carbon atoms removed from the carbonate moiety of the above formula, for a period of time which is at least sufficient to add an active hydrogen substituent from said compound to an isocyanato nitrogen of said organic diisocyanate.

2. The process of claim 1 wherein said organic diisocyanate is bis(isocyanatoalkyl) carbonate.

3. The process of claim 2 wherein said organic diisocyanate is bis(2-isocyanatoethyl) carbonate.

4. The process of claim 2 wherein said compound is a polyfunctional compound which contains at least two hydroxyl groups.

5. The process of claim 2 wherein said compound is alkylene glycol.

6. The process of claim 5 wherein said bis(isocyanatoalkyl) carbonate is bis(2-isocyanatoethyl) carbonate.

7. The process of claim 2 wherein said compound is a polyether glycol.

8. The process of claim 7 wherein said bis(isocyanatoalkyl) carbonate is bis(2-isocyanatoethyl) carbonate.

9. The process of claim 2 wherein said compound is a polyester polyol.

10. The process of claim 9 wherein said bis(isocyanatoalkyl) carbonate is bis(2-isocyanatoethyl) carbonate.

11. The process of claim 2 wherein said compound is a polyoxyalkylated polyol.

12. The process of claim 11 wherein said bis(isocyanatoalkyl) carbonate is bis(2-isocyanatoethyl) carbonate.

13. The process of claim 2 wherein said compound is an initiated lactone polyester polyol.

14. The process of claim 13 wherein said bis(isocyanatoalkyl) carbonate is bis(2-isocyanatoethyl) carbonate.

15. The process of claim 2 wherein said compound is an initiated lactone polyester diol.

16. The process of claim 15 wherein said bis(isocyanatoalkyl) carbonate is bis(2-isocyanatoethyl) carbonate.

17. The products resulting from the process which comprises contacting a compound which contains at least one active hydrogen as determined according to the Zerewitinoff method, with an organic diisocyanate of the formula

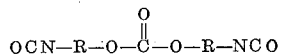

wherein each R represents a divalent group containing from 2 to 12 carbon atoms and which is of the group consisting of substituted and unsubstituted aliphatic, alicyclic, aromatic, and heterocyclic groups, and wherein each isocyanato moiety is at least two carbon atoms removed from the carbonate moiety of the above formula, for a period of time which is at least sufficient to add an active hydrogen substituent from said compound to an isocyanato nitrogen of said organic diisocyanate.

18. The products of claim 17 wherein said organic diisocyanate is bis(isocyanatoalkyl) carbonate.

19. The products of claim 18 wherein said bis(isocyanatoalkyl) carbonate is bis(2-isocyanatoethyl) carbonate.

20. The products of claim 18 wherein said compound is a polyfunctional compound which contains at least two hydroxyl groups.

21. The products of claim 18 wherein said compound is alkylene glycol.

22. The products of claim 18 wherein said compound is a polyether glycol.

23. The products of claim 18 wherein said compound is a polyester polyol.

24. The products of claim 18 wherein said compound is a polyoxyalkylated polyol.

25. The products of claim 18 wherein said compound is an initiated lactone polyester polyol.

26. The products of claim 18 wherein said compound is an initiated lactone polyester diol.

27. The products of claim 18 wherein said compound is an initiated lactone polyester diol which contains at least 50 mol percent carbonylpentamethyleneoxy units therein and which has an average molecular weight of from about 500 to about 5000.

28. The products of claim 27 wherein said bis(isocyanatoalkyl) carbonate is bis(2-isocyanatoethyl) carbonate.

29. A polyurethane diisocyanate of the formula

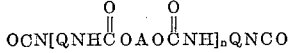

wherein A is a divalent aliphatic radical; wherein $n$ is a number having an average value of at least one; and wherein Q represents the divalent unit

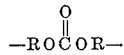

the R variables of said unit being divalent groups of from 2 to 12 carbon atoms and which are of the group consisting of substituted and unsubstituted aliphatic, alicyclic, aromatic, and heterocyclic groups.

30. The polyurethane diisocyanate of claim 29 wherein the unit

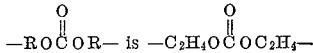

31. A process which comprises contacting an admixture containing (a) an organic diisocyanate as defined in claim 1, and (b) a polyfunctional chain extender which contains at least two functional groups of the group consisting of hydroxyl, primary amino, secondary amino, and mixtures thereof, (c) said admixture providing greater than about one equivalent of isocyanato group per equivalent of said functional group, for a period of time which is at least sufficient to add an active hydrogen substituent from said polyfunctional chain extender to an isocyanato nitrogen of said organic diisocyanate.

32. A cast polyurethane resin prepared by reacting an admixture containing (a) an organic diisocyanate as defined in claim 29, and (b) a polyfunctional chain extender which contains at least two functional groups of the group consisting of hydroxyl, primary amino, secondary amino, and mixtures thereof, (c) said admixture providing at least about one equivalent of isocyanato group per equivalent of said functional group.

33. A process which comprises contacting an admixture containing (a) an organic diisocyanate as defined in claim 1, and (b) a polyfunctional chain extender which contains at least two functional groups of the group consisting of hydroxyl, primary amino, secondary amino, and mixtures thereof (c) said admixture providing at least about one equivalent of said functional group per equivalent of isocyanato, for a period of time which is at least sufficient to add an active hydrogen substituent from said polyfunctional chain extender to an isocyanato nitrogen of said organic diisocyanate.

34. A thermoplastic polyurethane resin prepared by reacting an admixture containing (a) an organic diisocyanate as defined in claim 29, and (b) a polyfunctional chain extender which contains at least two functional groups of the group consisting of hydroxyl, primary amino, secondary amino, and mixtures thereof, (c) said admixture providing at least about one equivalent of said functional group per equivalent of isocyanato.

35. A process for producing a urethane foamed product which comprises reacting a diisocyanate compound as defined in claim 1 and a polyhydroxy compound in the presence of a blowing agent.

36. A process for producing a urethane foamed product which comprises reacting a polyurethane diisocyanate as defined in claim 29 and a polyhydroxy compound in the presence of a blowing agent.

37. A urethane foamed product prepared in accordance with claim 35.

38. A urethane foamed product prepared in accordance with claim 36.

39. A process for producing a reinforced plastic product which comprises reacting a diisocyanate compound as defined in claim 1, with a polyfunctional active hydrogen compound which contains at least two groups of the group consisting of hydroxyl, primary amino, secondary amino, and mixtures thereof, in admixture with glass.

40. The reinforced plastic product prepared in accordance with claim 39.

41. A process for producing a reinforced plastic product which comprises reacting a diisocyanate compound as defined in claim 26, with a polyfunctional active hydrogen compound which contains at least two groups of the group consisting of hydroxyl, primary amino, secondary amino, and mixtures thereof, in admixture with glass.

42. The reinforced plastic product prepared in accordance with claim 41.

43. An elastic fiber that comprises the reaction product of (1) a substantially linear, hydroxyl-terminated organic polymer having a molecular weight of at least about 500, a hydroxyl number below about 170, and a melting point below about 70° C., (2) an organic diisocyanate as defined in claim 1, and (3) a bifunctional compound which contains two groups of the class consisting of hydroxyl, primary amino, secondary amino, and mixtures thereof, wherein the composition defined in (1) is first reacted with a stoichiometric excess of the composition defined in (2) to form an isocyanato-terminated prepolymer, and wherein said prepolymer is then reacted with the composition defined in (3).

44. An elastic fiber of claim 43 wherein said organic diisocyanate is bis(2-isocyanatoethyl) carbonate.

45. An elastic fiber of claim 44 wherein said hydroxyl-terminated organic polymer is a hydroxyl-terminated polyurethane polymer.

References Cited by the Examiner

UNITED STATES PATENTS

| | | | |
|---|---|---|---|
| 3,106,537 | 10/1963 | Simon et al. | 260—2.5 |
| 3,108,976 | 10/1963 | Knox | 260—2.5 |
| 3,122,550 | 2/1964 | Heusser | 260—268 |
| 3,150,139 | 9/1964 | Shapiro et al. | 260—269 |
| 3,162,664 | 12/1964 | Brotherton et al. | 260—463 |
| 3,162,673 | 12/1964 | Brotherton et al. | 260—463 |

LEON J. BERCOVITZ, *Primary Examiner.*

DONALD E. CZAJA, *Examiner.*